US010996004B2

(12) United States Patent
Amendola et al.

(10) Patent No.: US 10,996,004 B2
(45) Date of Patent: May 4, 2021

(54) MECHANICAL-CHEMICAL ENERGY STORAGE

(71) Applicant: Eos Energy Storage, LLC, Edison, NJ (US)

(72) Inventors: Steven Amendola, Middletown, NJ (US); Tibor Kalnoki-Kis, Westlake, OH (US)

( * ) Notice: Subject to any disclaimer, the term of this patent is extended or adjusted under 35 U.S.C. 154(b) by 0 days.

(21) Appl. No.: 16/148,212

(22) Filed: Oct. 1, 2018

(65) Prior Publication Data

US 2019/0033008 A1  Jan. 31, 2019

Related U.S. Application Data

(62) Division of application No. 14/329,201, filed on Jul. 11, 2014, now Pat. No. 10,113,809.

(60) Provisional application No. 61/968,450, filed on Mar. 21, 2014, provisional application No. 61/844,914, filed on Jul. 11, 2013.

(51) Int. Cl.
*F25D 11/00* (2006.01)
*F28D 20/00* (2006.01)
*C09K 5/16* (2006.01)

(52) U.S. Cl.
CPC .............. *F28D 20/003* (2013.01); *C09K 5/16* (2013.01); *Y02E 60/142* (2013.01); *Y02P 20/124* (2015.11)

(58) Field of Classification Search
CPC ............... F28D 20/003; F28D 20/021; F28D 2020/006; C09K 5/16; Y02P 20/124; Y02E 60/142; F28F 5/0014; F28F 2005/0025; F28F 17/00; F28F 17/10; F28F 17/08; F28F 9/06; F28F 17/02; F28F 35/02

USPC ......................................................... 165/236
See application file for complete search history.

(56) References Cited

U.S. PATENT DOCUMENTS

| 2,990,694 A | 7/1961 | Kummerlowe |
| 3,440,832 A | 4/1969 | Aronson |
| 4,009,575 A | 3/1977 | Hartman, Jr. et al. |
| 4,024,908 A * | 5/1977 | Meckler ................ F24F 5/0046 165/225 |
| 4,171,619 A | 10/1979 | Clark |
| 4,186,794 A | 2/1980 | Brunberg et al. |
| 4,287,721 A | 9/1981 | Robison |

(Continued)

FOREIGN PATENT DOCUMENTS

| CZ | 302037 | 9/2010 |
| DE | 3212609 | 10/1983 |

(Continued)

OTHER PUBLICATIONS

International Preliminary Report on Patentability for PCT/US2014/046307 dated Jan. 21, 2016.

(Continued)

*Primary Examiner* — Davis D Hwu
(74) *Attorney, Agent, or Firm* — Botos Churchill IP Law LLP

(57) ABSTRACT

This invention generally relates to mechanical-chemical energy storage. In particular, the invention relates to a mechanical-chemical energy storage system that stores energy by simultaneously compressing a gas to a higher enthalpy state and recovering the heat of compression by driving a somewhat reversible chemical reaction. The heat energy in the chemical reaction is then recovered while the gas is expanding to a lower enthalpy state.

25 Claims, 17 Drawing Sheets

(56) References Cited

U.S. PATENT DOCUMENTS

| | | |
|---|---|---|
| 4,365,475 A | 12/1982 | Dunlap |
| 4,481,775 A | 11/1984 | Beveridge |
| 4,702,903 A | 10/1987 | Keefer |
| 4,971,605 A | 11/1990 | Tarman |
| 5,582,020 A | 12/1996 | Scaringe et al. |
| 6,126,723 A * | 10/2000 | Drost .............. B01B 1/005 96/4 |
| 7,347,049 B2 | 3/2008 | Rajendran et al. |
| 7,735,325 B2 | 6/2010 | Ruggieri et al. |
| 7,874,155 B2 | 1/2011 | McBride et al. |
| 8,436,489 B2 | 5/2013 | Stahlkopf et al. |
| 10,113,809 B2 | 10/2018 | Amendola et al. |
| 2002/0112479 A1* | 8/2002 | Keefer .............. F02B 43/10 60/651 |
| 2007/0012060 A1 | 1/2007 | Simons |
| 2007/0119175 A1 | 5/2007 | Ruggieri et al. |
| 2010/0132359 A1 | 6/2010 | Minhas et al. |
| 2010/0257862 A1 | 10/2010 | Howes |
| 2011/0146939 A1 | 6/2011 | Bond et al. |
| 2011/0314844 A1 | 12/2011 | Gu et al. |
| 2012/0102996 A1 | 5/2012 | Freund |
| 2012/0125002 A1 | 5/2012 | Lehar et al. |
| 2013/0038055 A1 | 2/2013 | Öström et al. |
| 2013/0192216 A1 | 8/2013 | Berlin, Jr. et al. |

FOREIGN PATENT DOCUMENTS

| | | |
|---|---|---|
| DE | 102009007874 | 8/2010 |
| JP | 2000-002790 | 1/2000 |
| SE | 9504383 | 7/1997 |
| WO | 1999/009365 | 2/1999 |
| WO | 2015/006666 | 1/2015 |

OTHER PUBLICATIONS

International Search Report for PCT/US2014/046307 dated Oct. 9, 2014.

Written Opinion of the International Searching Authority for PCT/US2014/046307 dated Oct. 9, 2014.

Robbins, Thomas et al., "Low-Grade Waste Heat Recovery for Power Production using an Absorption-Rankine Cycle", International Refrigeration and Air Conditioning Conference, 2010, Paper 1157.

* cited by examiner

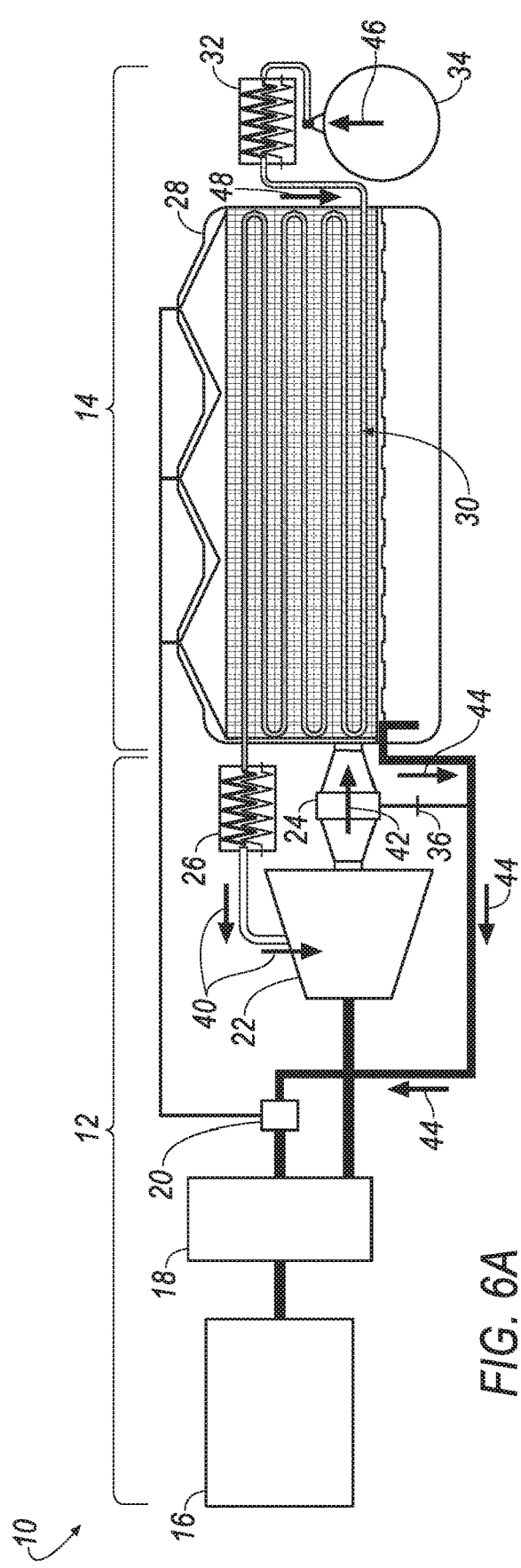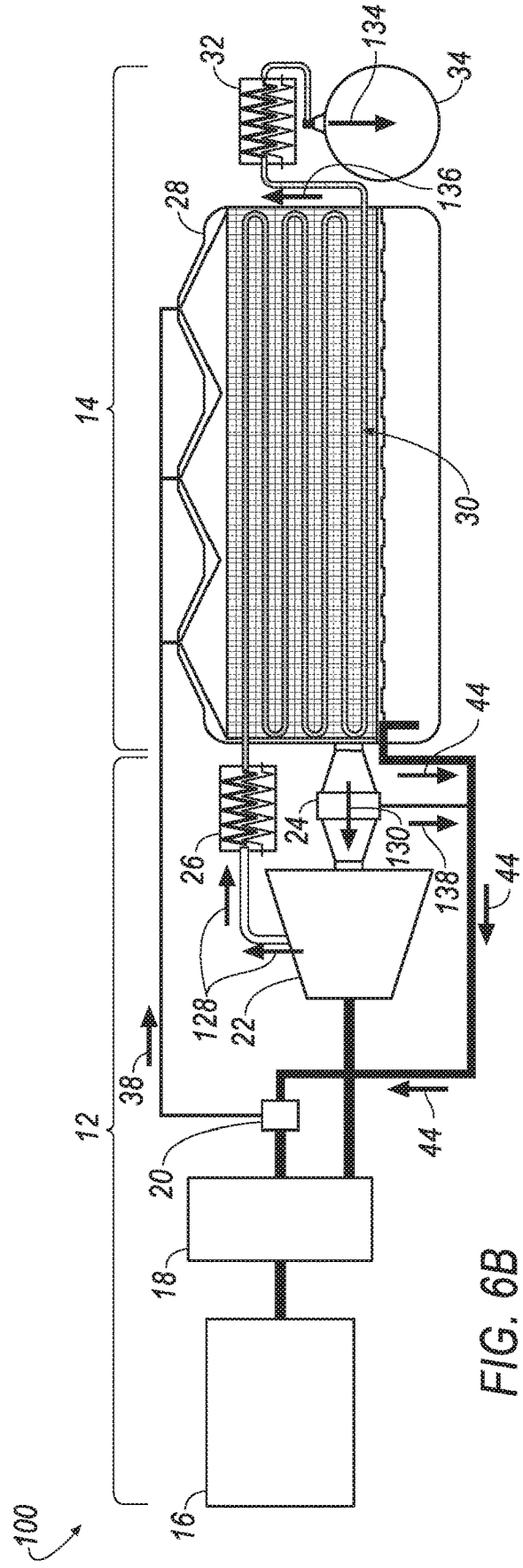

MECHANICAL-CHEMICAL ENERGY STORAGE

CROSS REFERENCE TO RELATED APPLICATION

This application is a divisional of U.S. application Ser. No. 14/329,201, filed on Jul. 11, 2014 and claims the benefit of U.S. Provisional Application Nos. 61/844,914, filed on Jul. 11, 2013, and 61/968,450, filed on Mar. 21, 2014. Each of these documents is incorporated herein in its entirety.

FIELD OF THE INVENTION

This invention generally relates to mechanical-chemical energy storage. In particular, the invention relates to a mechanical-chemical energy storage system that stores energy by simultaneously compressing a gas to a higher enthalpy state and recovering the heat of compression by driving a somewhat reversible chemical reaction. The heat energy in the chemical reaction is then recovered while the gas is expanding to a lower enthalpy state.

BACKGROUND

Energy storage is vitally important for the stability of the electric grid as it relies more on "non-dispatchable" sources of power such as solar and wind. Additionally, there are many applications where long term power may be needed apart from any grid such as in military or emergency situations. Currently, the most common solutions are lead-acid batteries and diesel generators. The shortcomings of these systems are well known. Most electrochemical batteries show a significant degradation in performance as they are discharged. This is evidenced by reduced voltage output and reduced maximum currents observed during the discharge of the battery. Batteries also tend to be less efficient and have reduced service lives when run at greater depths of discharge.

There is increased interest in using stored mechanical energy to ultimately serve as electrical energy storage for grid type applications. This interest is based in part on the robust nature and highly developed state of the art of mechanical power generation equipment, which is economical and scalable. In general, most energy storage schemes compress a working fluid to high pressures or liquefy the working fluid by compression and/or temperature reduction. Alternately, a series of heat pumps (often coupled to generators and/or other heat sources) indirectly accomplish this same goal where working fluid(s) is/are cycled with the combination of heat pumps. This alternative has higher cost associated with extra machinery. In general, to get higher recoveries (efficiencies that we will refer to as "round trip efficiency" or "RTE") requires more "stages" to recover energy, and each additional stage is met with reduced energy recovery. Thus, these systems require increased capital to achieve high RTE after more than two stages.

Other conventional energy storage systems store energy by compressing a gas to high pressure. Depending on the physical properties (critical temperature) of the gas, it may liquefy. During this compression process, heat is generated and much of this heat is generally lost, which results in reduced RTEs. This is a common problem in compressed air energy storage (CAES). The RTE of conventional systems is around 50%. RTEs of these systems are limited due to the use of assisting gas turbines during operation to increase the overall efficiency of that device. Assisting gas turbines are not a true energy storage systems, but act as a hybrid, wherein stored energy is only recovered if it is also desired to burn natural gas to run the gas turbine to create energy.

Traditional efforts to recover this heat from compression involve storing the heat of compression in a medium (such as water), as sensible heat, which simply raises the temperature of the water. This warm water is stored in an insulated tank until the energy is required to heat the working fluid while expanding it to recover that energy. However, warm water has reduced energy dense medium. Furthermore, the low temperature gradients present engineering challenges to achieve high power output that requires high rates of heat transfer over a low temperature gradient. Problems also exist due to heat from the stored water escaping from the insulated tank giving the system an apparent "self-discharge", analogous to electrochemical batteries.

SUMMARY OF THE INVENTION

The present invention solves one or more of the problems described above by combining the high energy density of a liquefied gas, the high RTE of operating near ambient temperatures, and the ability to achieve high power densities by generating the heat required for expansion when it is needed rather than storing heat for use at some other time.

In one aspect, the present invention provides a method for storing energy comprising: providing an absorbent reservoir containing a working fluid that is chemically absorbed by an absorbent; desorbing the working fluid from the absorbent in an endothermic process; and condensing the working fluid in an exothermic process and transferring the condensed working fluid to a working fluid reservoir under pressure; wherein at least some of the heat generated during the condensing step is recycled to drive the desorbing step.

Another aspect of the present invention provides a method for storing energy comprising providing an absorbent reservoir containing a working fluid that is chemically absorbed by an absorbent; desorbing the working fluid from the absorbent in an endothermic process; and condensing the working fluid in an exothermic process and transferring the condensed working fluid to a working fluid reservoir under pressure; wherein at least some of the heat generated during the condensing step is recycled to drive the desorbing step.

In some implementations, the working fluid comprises carbon dioxide, ammonia, nitrous oxide, air, or water. For example, the working fluid comprises carbon dioxide or ammonia. In some instances, the working fluid comprises ammonia. In other instances, the working fluid comprises nitrous oxide.

In some implementations, the absorbent comprises an organic amine, an inorganic base, an activated carbon, silica gel, a zeolite, a metal organic framework, or any combination thereof. For example, the absorbent comprises an organic amine selected from monoethanolamine, piperazine, ammonia, morpholine, diethanolamine, diglycolamine, diisopropanolamine, triethanolamine, dibutylamine, methyldiethanolamine, diethylenetriamine, or any combination thereof. In other examples, the absorbent comprises a metal halide salt, a mild acid, water, activated carbon, silica gel, a zeolite, or metal organic framework. And, in some examples, the absorbent comprises a food oil, silicone oil, activated carbon, silica gel, zeolite, or metal organic framework.

In some implementations, the heat generated from the condensing step is recycled to drive the desorbing step using a heat exchanger.

Some implementations further comprise compressing the working fluid using a reversible turbine.

Some implementations further comprise compressing the working fluid and storing the working fluid in the working fluid reservoir in a liquid state, a critical state, or a trans-critical state.

In some implementations, the working fluid is compressed to and stored at a pressure of from about 1 bar to about 100 bar.

Some implementations further comprise a second compression step after the first compression.

In some implementations, the working fluid is expanded to a pressure of from about 0.1 bar to 10 bar.

In some implementations, the working fluid is stored at ambient temperature.

Some implementations further comprise heating the working fluid prior to expansion using an external heat source.

Another aspect of the present invention provides a method of charging and discharging an energy storage system comprising charging the system comprising providing an absorbent storage tank containing a working fluid that is chemically absorbed by an absorbent; desorbing the working fluid from the absorbent in an endothermic process; condensing the working fluid in an exothermic process and transferring the condensed working fluid to a working fluid reservoir under pressure; recycling heat generated during the condensing step to drive the desorbing step; and storing the working fluid in a working fluid reservoir under pressure; and discharging the system comprising expanding the working fluid; chemically absorbing the working fluid with the absorbent in the absorbent reservoir in an exothermic process; recycling heat generated during the absorption reaction to drive the expanding step; and storing the absorbent and the absorbed working fluid in the absorbent reservoir.

In some implementations, the working fluid comprises carbon dioxide, ammonia, nitrous oxide, air, or water. For example, the working fluid comprises carbon dioxide. In another example, the working fluid comprises ammonia. And, in some examples, the working fluid comprises nitrous oxide.

In some implementations, the absorbent comprises an organic amine, inorganic base, activated carbon, silica gel, zeolite, or metal organic framework. For example, the absorbent comprises an organic amine selected from monoethanolamine, piperazine, ammonia, morpholine, diethanolamine, diglycolamine, diisopropanolamine, triethanolamine, dibutylamine, methyl-diethanolamine, or diethylenetriamine. In some examples, the absorbent comprises a metal halide salt, mild acid, water, activated carbon, silica gel, zeolite, or metal organic framework. And, in some examples, the absorbent comprises a food oil, silicone oil, activated carbon, silica gel, zeolite, or metal organic framework.

In some implementations, the heat generated during the condensing step is recycled drive the desorbing step using a heat exchanger.

In other implementations, the working fluid is compressed by a reversible turbine.

Some implementations further comprise compressing the working fluid and storing the working fluid in the working fluid reservoir in a liquid state, a critical state, or a trans-critical state.

In some implementations, the working fluid is compressed to and stored at a pressure of from about 1 bar to about 100 bar.

In other implementations, the compressing step comprises a two-stage compression process.

In some implementations, the working fluid is expanded to a pressure of from about 0.1 bar to 10 bar.

In other implementations, the working fluid is stored at ambient temperature.

Some implementations further comprise heating the working fluid prior to expansion using an external heat source.

Some implementations further comprise directing the flow of the working fluid a first direction during charging, and reversing the flow of the direction of the working fluid during discharging.

Another aspect of the present invention provides an energy storage system comprising a working fluid reservoir containing compressed working fluid; an expander that fluidly communicates with the working fluid reservoir and is configured to expand the working fluid; an absorbent storage reservoir containing an absorbent, wherein the absorbent reservoir fluidly communicates with the expander and is configured to receive and absorb the expanded working fluid; a first heat exchanger that thermally communicates with the absorbent reservoir and is configured to transfer heat generated by the absorption of the working fluid by the absorbent to the working fluid during the discharge of the system; a pressure release mechanism configured to reduce pressure in the absorbent reservoir; and a compressor that fluidly communicates with the absorbent reservoir and fluidly communicates with the working fluid reservoir and is configured to compress the working fluid that desorbs from the absorbent; and a second heat exchanger in thermal communication with the working fluid in the compressor, in thermal communication with the absorbent and working fluid in the absorbent storage tank, and configured to transfer heat that is generated by the compression of the working fluid, to the absorbent and working fluid in the absorbent storage tank.

In some embodiments, the working fluid comprises carbon dioxide, ammonia, nitrous oxide, air, or water.

In some embodiments, the absorbent comprises an organic amine, inorganic base, activated carbon, silica gel, zeolite, or metal organic framework. For example, the absorbent comprises an organic amine selected from monoethanolamine, piperazine, ammonia, morpholine, diethanolamine, diglycolamine, diisopropanolamine, triethanolamine, dibutylamine, methyl-diethanolamine, or diethylenetriamine. In other examples, the absorbent comprises a metal halide salt, mild acid, water, activated carbon, silica gel, zeolite, or metal organic framework. And, in some examples, the absorbent comprises a food oil, silicone oil, activated carbon, silica gel, zeolite, or metal organic framework.

In some embodiments, the compressor and expander comprise a reversible turbine.

In other embodiments, the compressor comprises a turbine, piston, radial reaction turbine.

In some embodiments, the expander comprises a turbine, piston, or turbo-expander.

Some embodiments further comprise an electrical generator connected to the expander.

Some embodiments further comprise a motor connected to the compressor.

Some embodiments further comprise an external heat source, in thermal communication with the expanded working fluid.

Some embodiments further comprising a controller connected to the compressor, expander, pressure release mechanism, absorbent storage tank, and working fluid storage tank.

In some embodiments, the first heat exchanger and second heat exchanger each comprise high surface area fin-shaped structures within the absorbent storage tank.

Some embodiments further comprise one or more additional compressors, fluidly connected to and positioned between the first compressor and the working fluid storage tank.

Some embodiments further comprise one or more additional expanders, fluidly connected to and positioned between the first expander and the absorbent storage tank.

In some embodiments, the pressure release mechanism is a valve.

Some embodiments further comprise a pump and a sprayer that each fluidly communicates with each other and with the absorbent storage tank, wherein the pump pumps the absorbent and absorbed working fluid to the sprayer and the sprayer sprays the fluid back into the absorbent storage tank. For example, the sprayer sprays the absorbent over a heat exchanger with high surface area fin-shaped structures within the absorbent storage tank.

Some embodiments further comprise a separator that fluidly communicates with the absorbent storage tank and the compressor.

In some embodiments, the separator is a centrifugal or cyclonic separator.

In some embodiments, the separator is a demister or a filter.

Another aspect of the invention provides a method of charging and discharging an energy storage system comprising: (i) charging the system comprising: providing an absorbent tank containing a working fluid that is chemically absorbed by an absorbent; desorbing the working fluid from the absorbent in an endothermic process; condensing the working fluid in an exothermic process and transferring the condensed working fluid to a working fluid reservoir under pressure; recycling heat generated during the condensing step to drive the desorbing step; and storing the working fluid in a working fluid reservoir under pressure; and (ii) discharging the system comprising: expanding the working fluid; chemically absorbing the working fluid with the absorbent in the absorbent reservoir in an exothermic process; recycling heat generated during the absorption reaction to drive the expanding step; and storing the absorbent and the absorbed working fluid in the absorbent reservoir.

Another aspect of the invention provides an energy storage system comprising: a working fluid reservoir containing compressed working fluid; an expander that fluidly communicates with the working fluid reservoir and is configured to expand the working fluid; an absorbent storage reservoir containing an absorbent, wherein the absorbent reservoir fluidly communicates with the expander and is configured to receive and absorb the expanded working fluid; a first heat exchanger that thermally communicates with the absorbent reservoir and is configured to transfer heat generated by the absorption of the working fluid by the absorbent to the working fluid during the discharge of the system; a pressure release mechanism configured to reduce pressure in the absorbent reservoir; a compressor that fluidly communicates with the absorbent reservoir and fluidly communicates with the working fluid reservoir and is configured to compress the working fluid that desorbs from the absorbent; and a second heat exchanger in thermal communication with the working fluid in the compressor, in thermal communication with the absorbent and working fluid in the absorbent storage tank, and configured to transfer heat that is generated by the compression of the working fluid, to the absorbent and working fluid in the absorbent storage tank.

BRIEF DESCRIPTION OF THE DRAWINGS

FIG. 6A is a schematic of an embodiment of a mechanical-chemical energy storage system being discharged.

FIG. 6B is a schematic of an embodiment of a mechanical-chemical energy storage system being charged.

Figure 1:
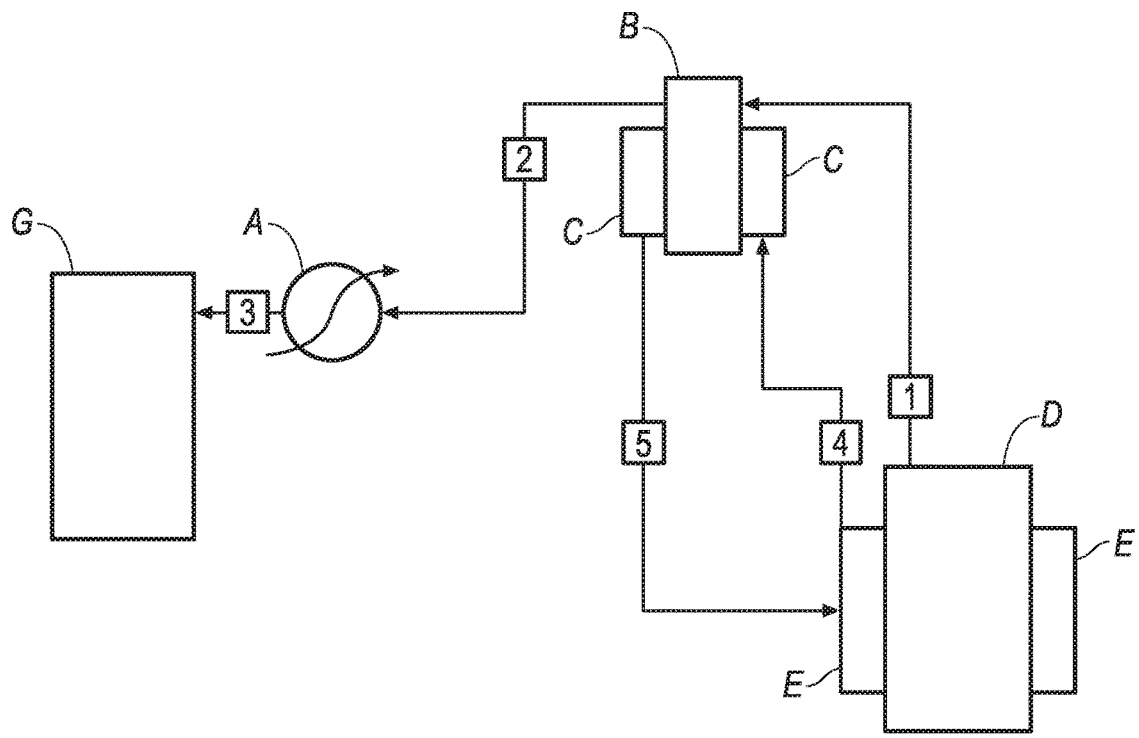
FIG. 1 is a schematic diagram of an embodiment of the mechanical-chemical energy storage system of the present invention being charged.

These figures are provided by way of example and are not intended to limit the scope of the invention.

DETAILED DESCRIPTION

In one aspect, the invention relates to the storage and delivery of energy as mechanical energy. In as much as mechanical and electrical energy are easily interchanged at high efficiencies by motors and generators, the system may also function as a "battery" even though there are no electrochemical reactions involved in the storage of energy by this invention notwithstanding the incidental use of conventional batteries for some system functions.

In another aspect, the invention relates to a chemical and thermodynamic system for energy storage. Energy is stored and released using distinct charge and discharge processes. This system simultaneously compresses a working fluid to a higher enthalpy state and recovers the heat of compression by driving a reversible chemical reaction. The compressed fluid is then expanded to a lower enthalpy state and chemically absorbed, driving the reverse exothermic reaction, from which heat can be supplied to increase the expansion efficiency.

During the discharge process, compressed working fluid (e.g., liquefied or supercritical gas) from a storage tank is expanded through an expansion device such as a turbine, piston, or nozzle, thereby generating power. The expansion results in cooling of the working fluid. The expanded working fluid (gas) exiting the expansion device undergoes a reversible chemical reaction with an absorbent that releases heat (exothermic). The heat is captured, for example by a heat exchanger, and the heat is transferred to the compressed working fluid that has yet to undergo expansion. This transferred heat beneficially increases the enthalpy of the working fluid prior to expansion, thus allowing for greater energy production. The process can continue until the compressed working fluid storage tank is empty.

During the charge process, the absorbed working fluid is desorbed through an endothermic reaction that is driven by a reduction in the pressure of the working fluid and absorbent. Energy is provided to a compression device that compresses the working fluid to a liquid or supercritical state and is stored in a storage tank. Heat from the compression process is captured and transferred to drive the endothermic desorption reaction. The process can continue until all of the working fluid has been desorbed and stored in the storage tank.

The systems and methods of the present invention have some or all of the following properties:

High RTE.
A high energy density due to high density material forms.
A closed cycle device not limited to air or nitrogen as a working fluid.
Scalable using existing equipment for power generation and handling of liquefied gases.
Energy and power performance specifications can be designed independently of each other.
Very low cost.
Extremely, long cycle life.
No self-discharge as heat is never stored as sensible heat but only as chemical potential.
Ability to use waste heat or extract heat from the atmosphere to achieve even greater energy conversions.

I. Definitions

For brevity, from here on we will refer to the "grid" as being any application or solution for which the invention is suitable. We shall also refer to the operation of any of these systems in which energy is put into the device to charge it, as "charging" or "recharging". Consistent with this definition, when energy is taken out of the device it is referred to as "discharging". Any cycle of charge (partial or full) and discharge (partial or full) will simply be referred to as a "cycle".

As used herein, "chemical absorption" refers to absorption using a chemical bond of a covalent pair to form either a solution or compound.

As used herein, the term "tank" and "reservoir" are used interchangeably to refer to a storage chamber.

As used herein, "desorption" is a process that is the inverse of absorption whereby some, or all, of an absorbed substance is released. Specifically, desorption is the process by which the molecules of a covalent pair are separated from each other in order to form, or reconstitute the original, prior to absorption, covalent pair.

For brevity, embodiments of the invention may be described as involving either an "absorption" or "adsorption" process. It will be understood to the reader that either process may be used in the embodiments of the invention depending on the choice of materials. Similarly, the terms "absorption agent", "absorbent", or "sorbent" are used interchangeably and may each refer to either a liquid or a solid agent that can absorb or adsorb a fluid, respectively.

As used herein, "round trip efficiency" or "RTE" is calculated as the power produced during expansion divided by the power required for compression.

As used herein, "activated carbon" is a form of carbon processed to be riddled with small, low-volume pores that increase the surface area available for adsorption or chemical reactions.

As used herein, the term "metal organic framework" refers to crystalline compounds consisting of metal ions or clusters coordinated to organic molecules to form one-, two-, or three-dimensional structures. In some cases, the structures are porous and the pores are stable during elimination of the guest molecules (often solvents) and can be used for the storage of gases.

As used herein, the term "food oil" refers to oils commonly used in cooking and food preparation including olive oil, palm oil, soybean oil, canola oil (rapeseed oil), pumpkin seed oil, corn oil, sunflower oil, safflower oil, peanut oil, grape seed oil, sesame oil, argan oil, rice bran oil and other vegetable oils.

As used herein, the term "silicone oil" refers to any liquid polymerized siloxane with organic side chains. Examples of silicone include are hexamethyldisiloxane and simethicone.

As used herein, the terms "first" and/or "second" do not refer to order or denote relative positions in space or time, but these terms are used to distinguish between two different elements or components. For example, a first component does not necessarily proceed a second component in time or space; however, the first component is not the second component and vice versa. Although it is possible for a first component to precede a second component in space or time, it is equally possible that a second component precedes a first component in space or time.

II. Systems

Referring to FIGS. 1-4, one embodiment of the present invention provides a system for storing energy comprising an absorbent tank or reservoir D, wherein the absorbent tank stores an absorbent capable of dissolving a working fluid; a compressor B that compresses a working fluid; a heat exchanger A (e.g., an ambient air vaporization heat exchanger) that transfers heat to or from the compressed working fluid; a working fluid tank or reservoir G that receives and stores the compressed cooled working fluid; and an expander H through which the compressed working fluid undergoes volumetric expansion. Some examples optionally comprise additional heat exchangers C, E, F, I, and J that can cool or heat a working fluid or mixture of a working fluid and absorbent.

In this embodiment, the system undergoes charging or recharging when desorbed working fluid (e.g., working fluid in a liquid physical state) is channeled from the absorbent tank or reservoir to the compressor (e.g., a piston cylinder) along flow pathway 1 where the working fluid is compressed. From the compressor, the compressed working fluid is channeled along flow pathway 2 to a heat exchanger that cools and/or condenses the compressed working fluid. The cooled and/or condensed working fluid is channeled along flow pathway 3 to the working fluid tank where it is stored until the system discharges energy. During the charging process, heat may be transferred in a closed loop, along flow pathways 4 and 5, from the compressor to the absorbent tank to enhance the efficiency of the system.

In this embodiment, the system undergoes discharging when desorbed working fluid is channeled from the working fluid tank, along flow pathways 6 and 7, to one or more heat exchangers that transfer heat to the working fluid. From the one or more heat exchangers, the heated working fluid is channeled, along flow pathway 8, to the expander wherein the working fluid undergoes volumetric expansion. Energy is discharged from system from the expander that may be coupled with a generator for producing electrical energy. The expanded working fluid, i.e., working fluid in a gaseous physical state, is channeled, along flow pathways 9 and 10, to the absorbent tank, wherein the working fluid is mixed or dissolved in the absorbent. In some embodiments, heat flows, along flow pathway 11, from one or more heat exchangers to the condensed working fluid before the fluid is expanded. After the working fluid is expanded, the one or more heat exchangers can transfer heat, along flow pathway 12, away from absorbent tank where heat is generated during the dissolution of the working fluid in the absorbent.

Alternatively, the system of the present invention may undergo discharging when desorbed working fluid having a liquid physical state is channeled, along flow pathway 13, to an expander wherein the liquid working fluid is transformed into an expanded vapor. The expanded vapor is channeled, along flow pathways 14 and 15, to one or more heat exchangers that transfer heat to or from the expanded vapor. The working fluid is then channeled, along flow pathway 16, to the working fluid tank, where it is stored until the system undergoes charging or recharging.

The system may undergo charging when desorbed working fluid is channeled, along flow pathways 17 and 18, from the working fluid tank to one or more heat exchangers and, along flow pathway 19, to the compressor, wherein the working fluid is compressed. From the compressor, compressed working fluid is channeled to one or more heat exchangers, along flow pathways 20-22, to the absorbent tank wherein the working fluid is mixed or dissolved in the absorbent.

Another aspect of the present invention relates to an energy storage system comprising: a working fluid reservoir containing compressed working fluid; an expander that fluidly communicates with the working fluid reservoir and is configured to expand the working fluid; an absorbent storage reservoir containing an absorbent, wherein the absorbent reservoir fluidly communicates with the expander and is configured to receive and absorb the expanded working fluid; a first heat exchanger that thermally communicates with the absorbent reservoir and is configured to transfer heat generated by the absorption of the working fluid by the absorbent to the working fluid during the discharge of the system; a pressure release mechanism configured to reduce pressure in the absorbent reservoir; a compressor that fluidly communicates with the absorbent reservoir and fluidly communicates with the working fluid reservoir and is configured to compress the working fluid that desorbs from the absorbent; and a second heat exchanger in thermal communication with the working fluid in the compressor, in thermal communication with the absorbent and working fluid in the absorbent storage tank, and configured to transfer heat that is generated by the compression of the working fluid, to the absorbent and working fluid in the absorbent storage tank.

In some embodiments, the working fluid comprises carbon dioxide, freon, methane, ammonia, nitrous oxide, air, or water.

In some embodiments, the working fluid comprises carbon dioxide.

In some embodiments, the absorbent comprises an organic amine, inorganic base, activated carbon, silica gel, zeolite, or metal organic framework.

In some embodiments, the absorbent comprises an organic amine selected from monoethanolamine, piperazine, ammonia, morpholine, diethanolamine, diglycolamine, diisopropanolamine, triethanolamine, dibutylamine, methyldiethanolamine, or diethylenetriamine. For example, the absorbent comprises monoethanolamine (MEA). In some embodiments the absorbent comprises a mixture of MEA and water.

In some embodiments, the working fluid comprises ammonia.

In some embodiments, the absorbent comprises a metal halide salt (e.g. $MgCl_2$ or $CaCl_2$), mild acid, water, activated carbon, silica gel, zeolite, or metal organic framework.

In some embodiments, the working fluid comprises nitrous oxide.

In some embodiments, the absorbent comprises a food oil, silicone oil, activated carbon, silica gel, zeolite, or metal organic framework.

In some embodiments, the compressor and expander comprise a reversible turbine.

In some embodiments, the compressor comprises a turbine, piston, radial reaction turbine.

In some embodiments, the expander comprises a turbine, piston, or turbo-expander.

In some embodiments, the system further comprises an electrical generator connected to the expander.

In some embodiments, the system further comprises a motor connected to the compressor.

In some embodiments, the system further comprises an external heat source, in thermal communication with the expanded working fluid.

In some embodiments, the system further comprises a controller connected to the compressor (motor), expander (generator), pressure release mechanism, absorbent storage tank, working fluid storage tank, or any combination thereof.

In some embodiments, the first heat exchanger and second heat exchanger each comprise high surface area fin-shaped structures within the absorbent storage tank.

In some embodiments, the system further comprises one or more additional compressors, fluidly connected to and positioned between the first compressor and the working fluid storage tank.

In some embodiments, the system further comprises one or more additional expanders, fluidly connected to and positioned between the first expander and the absorbent storage tank.

In some embodiments, the pressure release mechanism is a valve.

In some embodiments, the system further comprises a pump that fluidly communicates with the absorbent storage tank and a sprayer in fluid communication with the pump and the absorbent storage tank. For example, the pump pumps the absorbent and absorbed working fluid to the sprayer and the sprayer sprays the fluid back into the absorbent storage tank. In some embodiments, the sprayer atomizes the fluid to small droplets. In some embodiments the sprayer sprays the absorbent over the heat exchanger with high surface area fin-shaped structures within the absorbent storage tank.

In some embodiments, the system further comprises a separator that fluidly communicates with the absorbent storage tank and the compressor. In some embodiments the separator is a centrifugal or cyclonic separator. In other embodiments the separator is a demister or a filter.

Figure 5A:
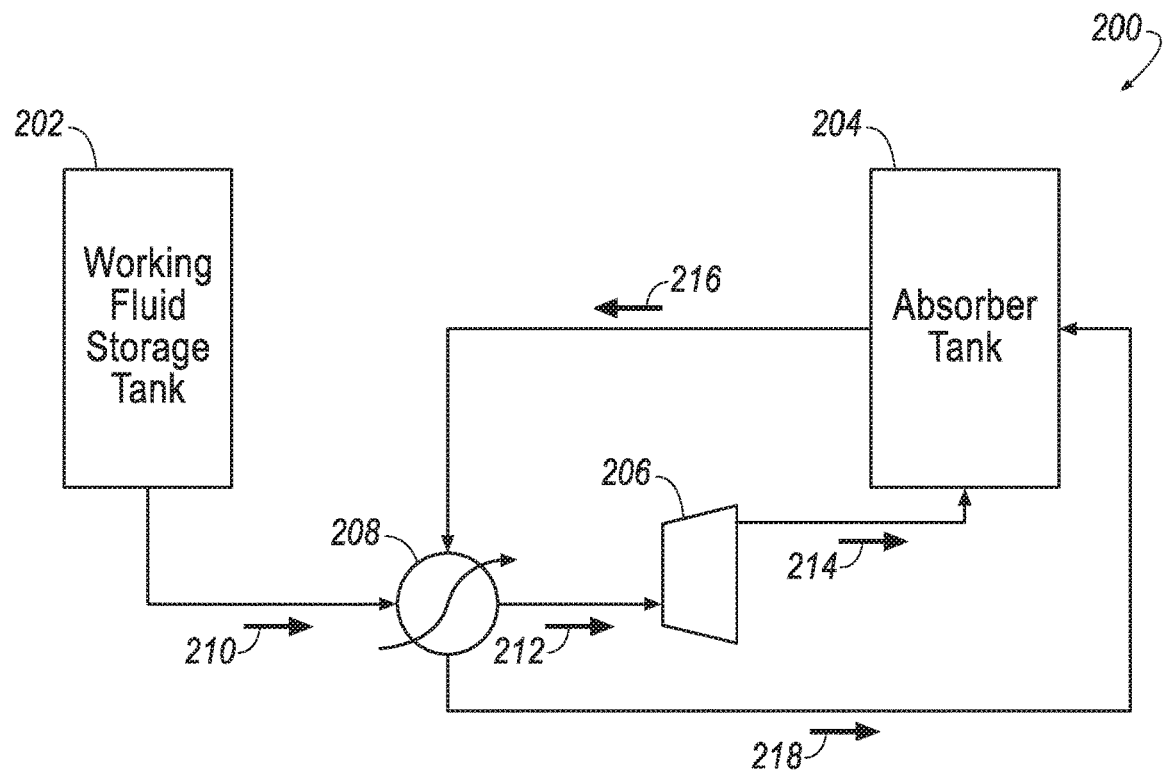
FIG. 5A is a schematic of an embodiment of the mechanical-chemical energy storage system of the present invention being discharged.
Figure 5B:
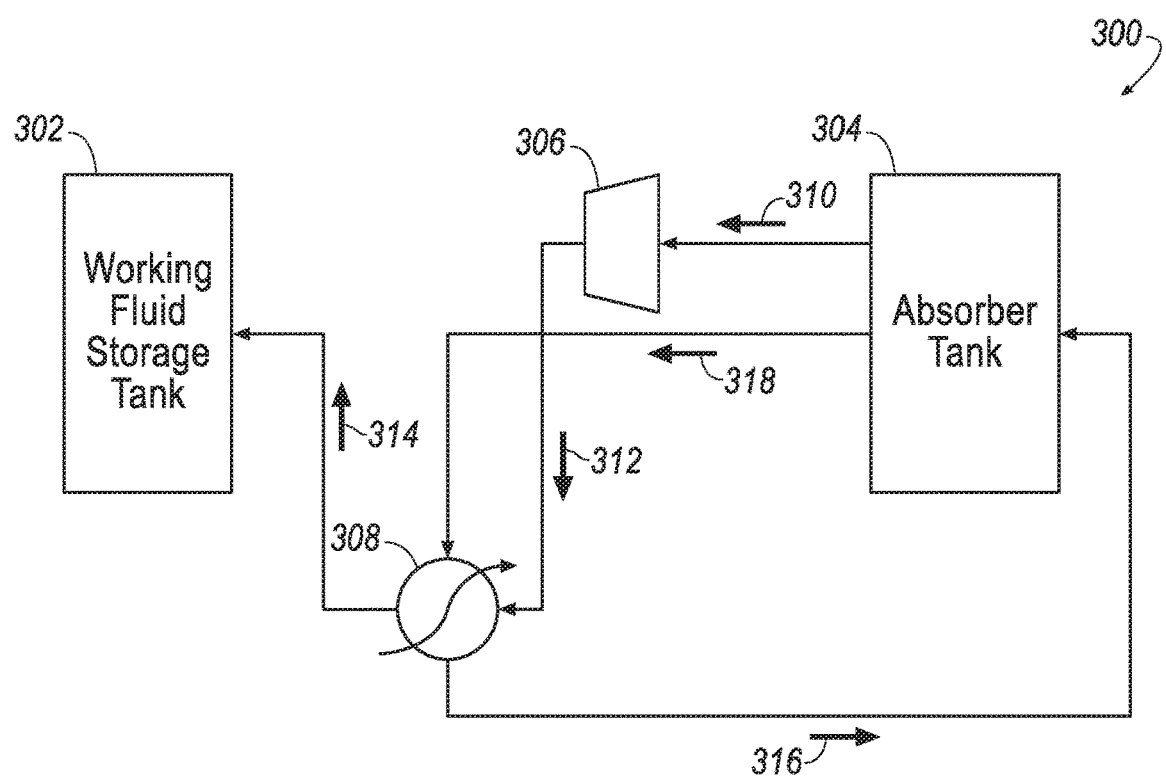
FIG. 5B is a schematic of an embodiment of the mechanical-chemical energy storage system of the present invention being charged.

Another embodiment of the present invention, illustrated in FIGS. 5A and 5B, uses a liquid-density working fluid to store energy. FIG. 5A illustrates a system according to one embodiment of the present invention being discharged 200. The working fluid is stored in either a liquid or pressurized fluid state within the working fluid storage tank 202 until it is needed. Power is generated by allowing the working fluid to release from the working fluid storage tank 202 along flow path 210 and run through a heat exchanger 208, and then through flow path 212 into an expander 206 (e.g., a turbo-expander or piston expander) to produce work. After undergoing expansion, the working fluid is a low density vapor. This material is then channeled along flow path 214 to the absorber storage tank 204 and condensed using either a liquid or solid absorbent (or "sorbent"). In some embodiments, the absorbent-working fluid combination has a high heat of solution. The heat generated from mixing the two materials is transferred via heat exchanger 208 to heat the working fluid being delivered to the expander. At the end of a complete discharge, the working fluid storage tank will contain pressurized vapor, and the absorber tank will contain the absorbent saturated with working fluid.

FIG. 5B illustrates this system being charged or recharged 300. Recharging the system involves separating the working fluid from the sorbent and then channeling the working fluid along flow path 310 to the compressor 306 that compresses the working fluid and returns the working fluid to the working fluid storage tank 302 along flow paths 312 and 314. In several instances, the working fluid is separated from the absorbent either by decreasing the system pressure or increasing the system temperature, although other suitable methods of separation exist. During desorption, the working fluid undergoes cooling. The cooled working fluid may be used to condense the compressed vapor before returning the working fluid to its storage tank 302. In some embodiments, additional heat exchangers may be used to enhance heat removal, i.e., cooling. Tanks 302, 304 and heat exchanger 308 may be used in both discharge and recharge mode; and, only the compressor 306 and turbo-expander 206 are unique to each step. In some embodiments, a reversible turbine may be used that can be configured to function as either a compressor or expander as needed.

FIGS. 6A and 6B illustrate another embodiment of the present invention. The embodiment depicted in FIGS. 6A and 6B show the system of the present invention operating as an electrical energy storage system.

In FIG. 6A, the electrical energy storage system 10 is discharging energy (e.g., electrical energy). This system has a power side 12 and an energy side 14. The energy storage and power generation may be designed to give a wide range of combinations of energy and power for many applications. The working fluid or gas exits working fluid tank 34 along flow path 46. As the working fluid or gas exits the working fluid tank, it passes through one or more heat exchangers 30, 32. The heat exchangers capture the heat of reaction between the working fluid (e.g., $CO_2$) and the absorbent (e.g., an amine absorbent). The reaction occurs on the outer surface of the heat exchanger 30 and the heat from this reaction is transferred to the working fluid (e.g., $CO_2$) in the pipe of the heat exchanger. The heated working fluid (e.g., $CO_2$) is transported along flow path 40 to the expander 22 where the compressed or pressurized working fluid (e.g., $CO_2$) expands to generate energy. In some embodiments, the expander is connected to a gearbox 18 and a generator 16 through any suitable mechanical connection to generate the desired electrical output. The expander (e.g., turbine) may be connected to a generator of any type (e.g., AC, DC, 3-phase, or the like) or the shaft power may be used for any desired purpose. Optionally, an additional heat exchanger 26 may provide additional heat (e.g., sourced from waste heat or other heat source) to the working fluid prior to expansion. After expansion, the working fluid may flow through an optional separator 24, and then into the absorber tank 28.

There are several suitable expansion type devices available to recover the energy from expanding gases. These can be of any design and include both turbines and piston type motors. In general, the turbines, when used in this application, are commonly called "turbo-expanders". In some embodiments, the expander or turbo-expander obtains conversion efficiency in excess of about 80% of the energy in the expanding gas. In other embodiments, the turbo-expander obtains about 90% efficiency. In some embodiments, the expander is a radial reaction turbine (RRT). And, in some embodiments, the RRT is configured to run with supercritical working fluids, such as $CO_2$, to achieve high efficiencies. To use an RRT, the absorbent(s) are selected that match the pressure range of the output of the RRT in the system.

The critical temperature of $CO_2$ is 31° C. At this temperature, the pressure of the $CO_2$ is 56 bar. In some instances, the pressures in the RRT vary between about 50 bar and about 120 bar. If a solid absorbent is paired with a supercritical working fluid (e.g., $CO_2$), the heat transfer associated with the solid absorbent will be improved because supercritical fluids are efficient heat transfer agents.

As illustrated in FIG. 6A, during the discharge, the rate of discharge is regulated by the rate of the working fluid passing through the turbo-expander. Increases in flow rate are associated with increases in power output. Power output may be controlled by standard control valves or mass flow controllers. A higher flow rate also means that more working fluid (e.g., $CO_2$) is entering the absorbent reservoir and more heat is generated from the reaction of the working fluid with the absorbent. This heat corresponds with the increased amount of working fluid that requires heating at these higher rates. Thus, heat is generated in suitable amounts as needed, and there is no requirement to store a hot gas or liquid for use at a later time.

Figure 7A:
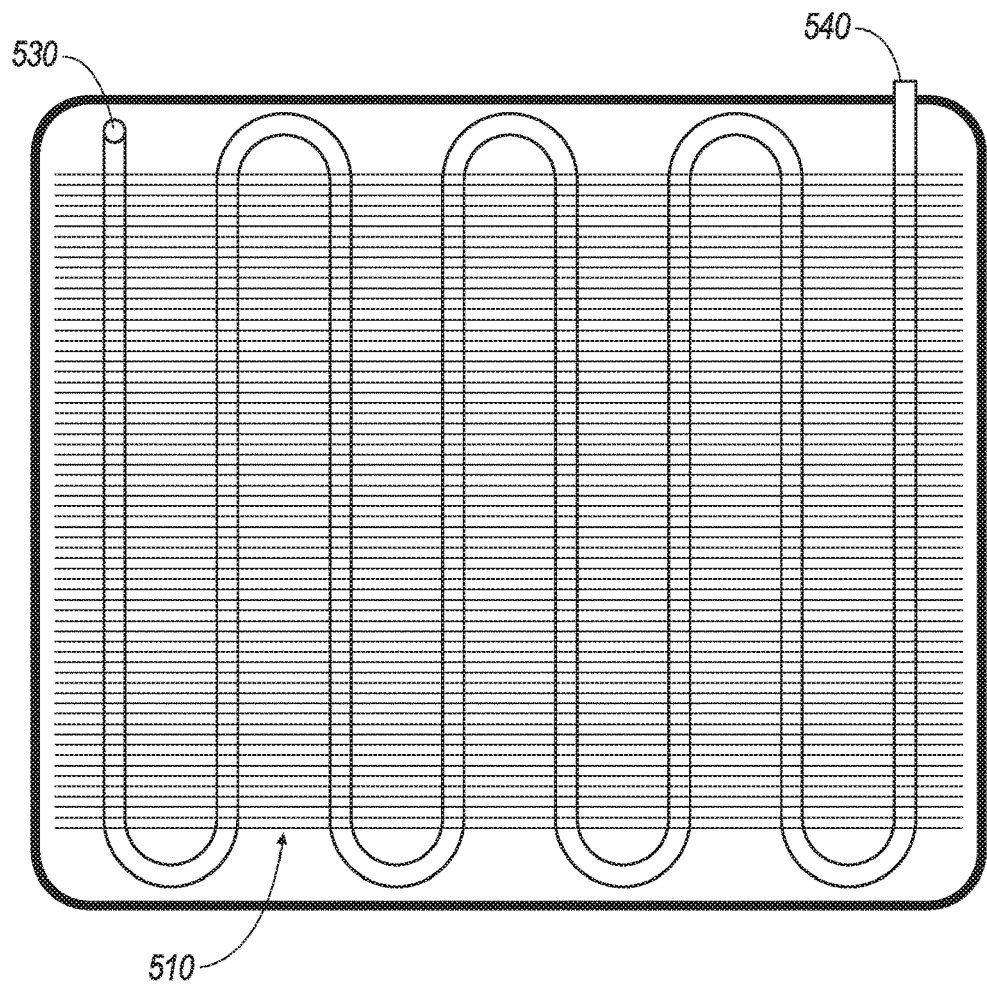
FIG. 7A is an illustration of a top view of a heat exchanger in accordance with the present invention having high surface area fin-shaped structures ("fins") integrated with an absorbent storage tank.
Figure 7B:
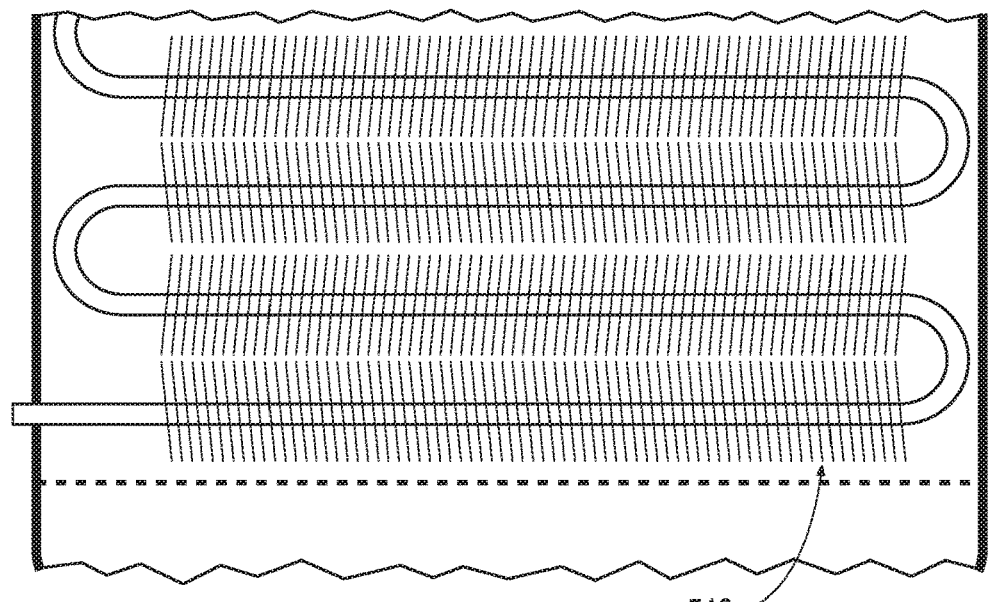
FIG. 7B is an illustration of a side view of a heat exchanger in accordance with the present invention having high surface area fin-shaped structures ("fins") integrated with an absorbent storage tank.

In systems of the present invention, heat exchangers can possess any suitable configuration. FIGS. 7A and 7B illustrate one configuration for optional heat exchanger 26 in accordance with the present invention. In this configuration, cold working fluid or a mixture of cold working fluid and cold absorbent is channeled through serpentine piping 550 that thermally communicates with heat exchanger fins 510. Cold working fluid or mixture enters the serpentine piping 530 and exits as heated working fluid or a heated mixture 540. This optional heat exchanger can also be used to extract heat from other sources such as waste heat in any form or even from the environment if the ambient temperature is above the temperature of the fluid or gas entering the turbo-expander.

Referring to FIG. 6A, the absorbent is a pumpable liquid that may be pumped along flow path 38 by pump 20, in this example, directly over the heat exchanger 30 and stored in the working fluid storage tank. In some embodiments, an exothermic chemical reaction occurs between this liquid and the incoming working fluid (e.g., $CO_2$), and heat is generated directly on fins of the heat exchanger 30 within the absorbent reservoir.

The working fluid travels along flow paths 44, 130, and 138 to a compressor. Electrical energy runs motor 106 that compresses or increases the pressure of the working fluid. The motor may operate compressor 108 or the motor may reverse the operation of turbo-expander so that the turbo-expander functions to compress the working fluid. Any suitable compressor can be used to complete this step. The pressurized work fluid is channeled along flow path 128, 134, and 136 to the working fluid storage tank, where it is stored until a discharge cycle begins.

Figure 8A:
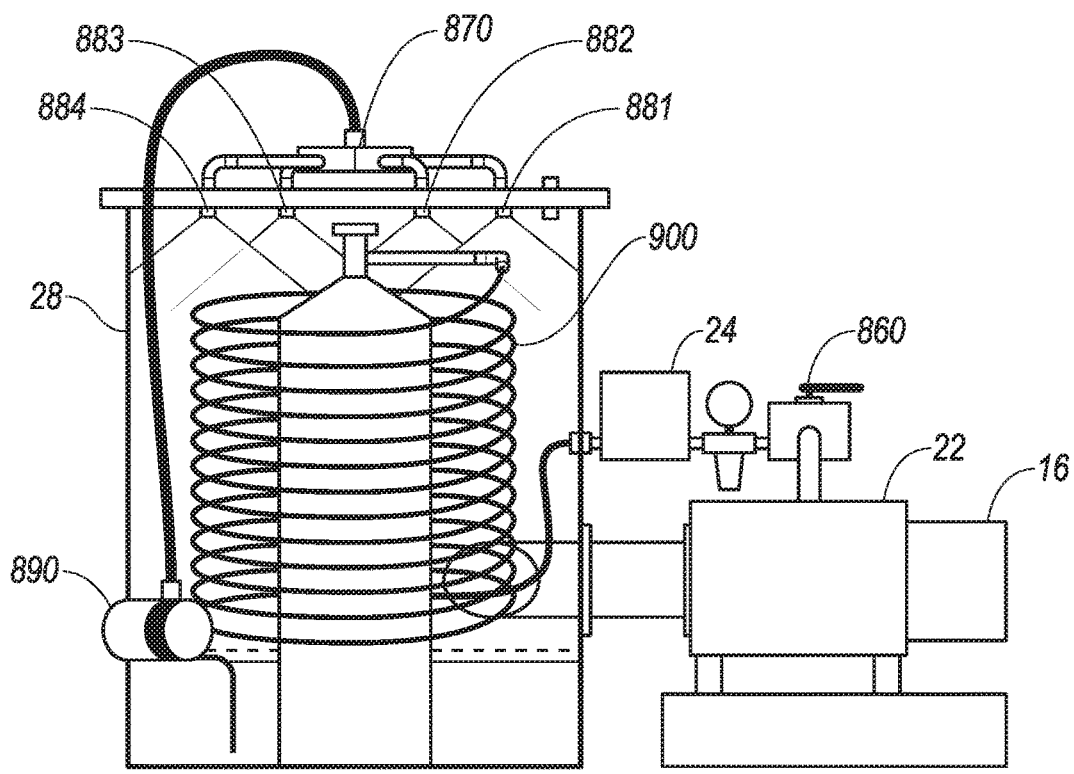
FIG. 8A is a side view of a mechanical-chemical energy storage system according to the present invention.
Figure 8B:
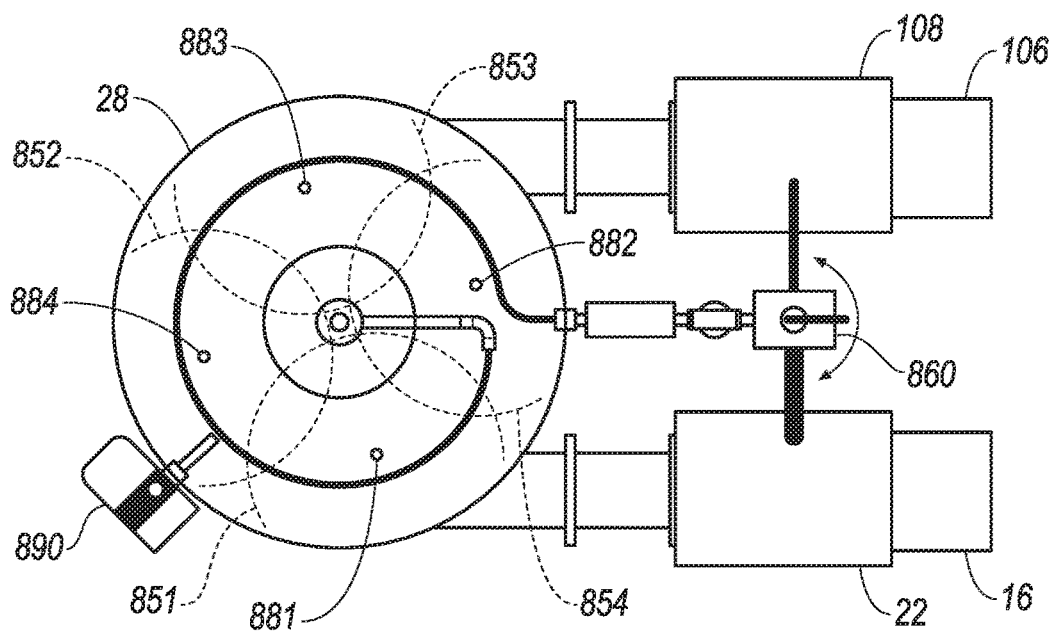
FIG. 8B is a top view of a mechanical-chemical energy storage system according to the present invention.

As illustrated in FIGS. 8A and 8B, the compressor and expander (e.g., turbo-expander) may be different devices, or the turbo-expander may also act as the compressor. In this embodiment, absorbent pump 890 pumps absorbent to distribution manifold 870 wherein the absorbent is sprayed from spray nozzles 881-884 onto the heat exchanger 900 that comprises spirally wound pipe that channels working fluid to the expander and/or from the compressor. As illustrated, systems of the present invention may optionally include one or more pall rings 851-854 inside the absorbent tank and/or inside the working fluid tank. Moreover, the charging and discharging of systems of the present invention may also be accomplished using a controller such as valve 860, which operates to control the flow path for the working fluid during charging and discharging.

Figure 9:
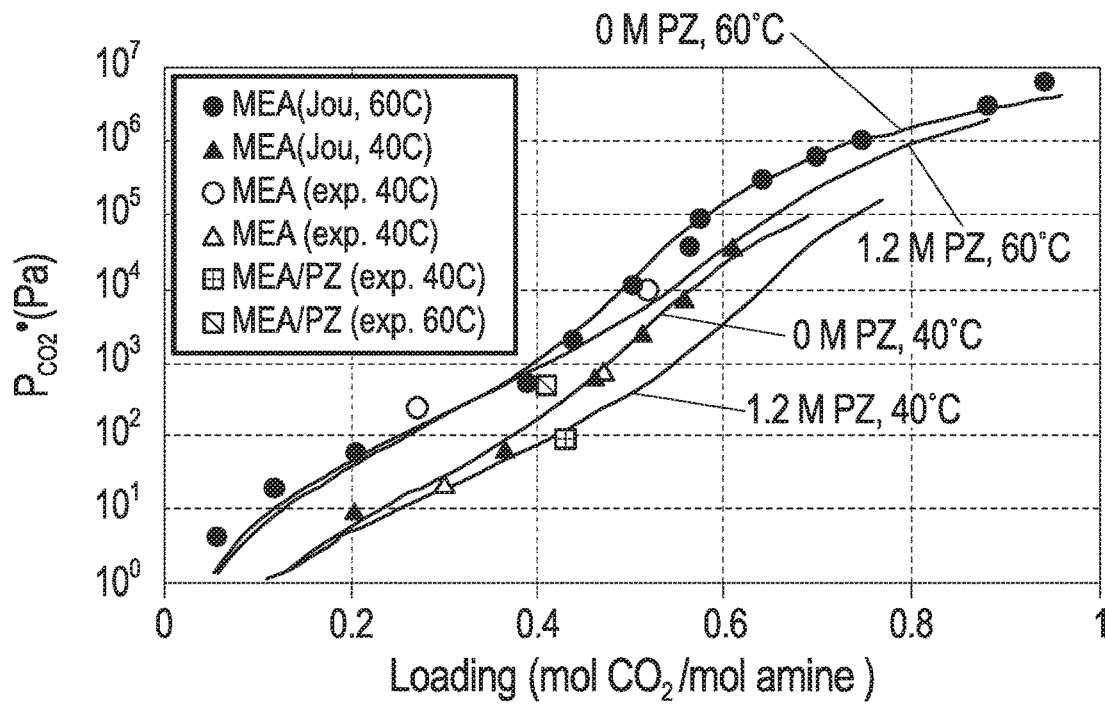
FIG. 9 is a graph of $CO_2$ working fluid pressure versus the concentration of $CO_2$ in an amine generated using a computer model of an embodiment of the present invention.
Figure 10:
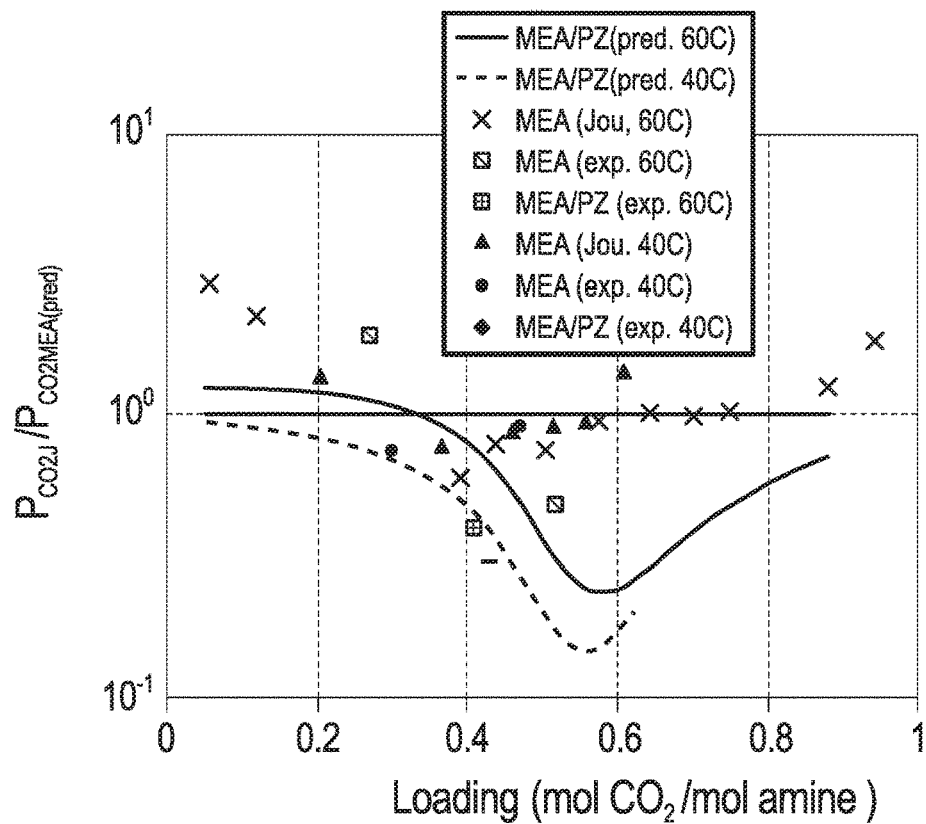
FIG. 10 is a graph of $CO_2$ working fluid partial pressure in a $CO_2$/amine solution versus the concentration of $CO_2$ in an amine generated using a computer model of an embodiment of the present invention.
Figure 11:
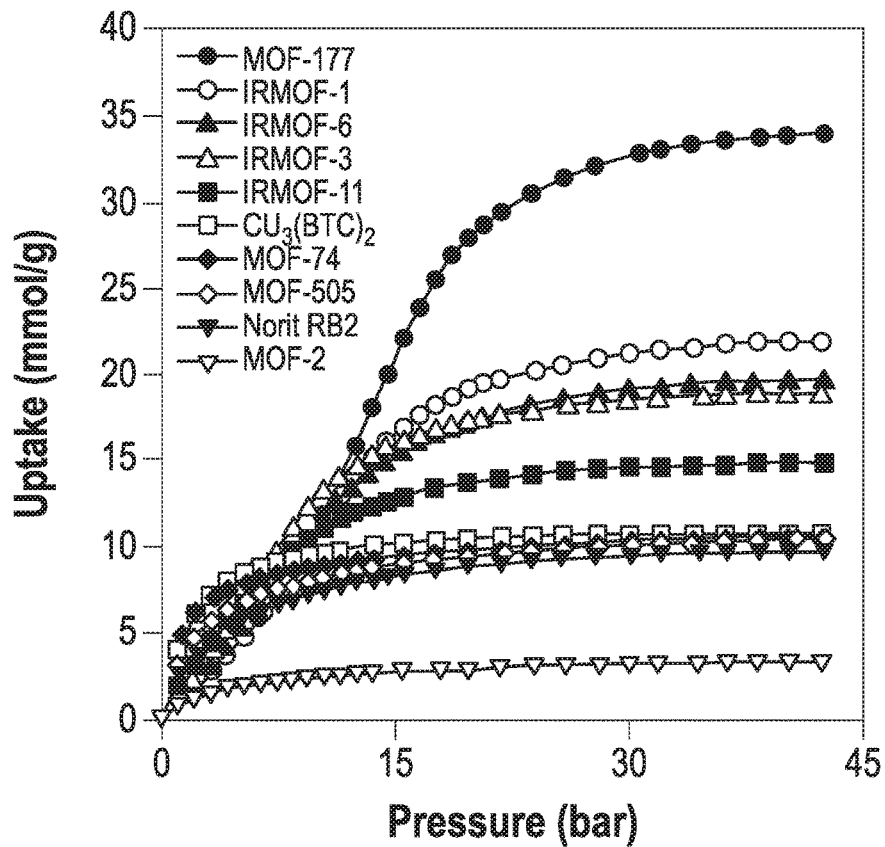
FIG. 11 is a graph of uptake of several metal organic frameworks and activated carbons as a function of pressure, generated using a computer model of embodiments of the present invention.

Depending on how much pressure change is desired in the cycle, the compressor may be one or more (e.g., 1, 2, 3, 4, or more) stages. The choice of pressure range is governed by design choices based on absorbent properties and the desired energy density. Energy density is related to the operating pressure since, as can be seen by FIGS. 9-11 that typical absorbents give different amounts of working fluid (e.g., $CO_2$) capacity depending on pressure and temperature. Thus, if an absorbent that can absorb (and release during recharge) more working fluid (e.g., $CO_2$) than another absorbent will have a better energy density compared with the other absorbent that does not absorb as much working fluid (e.g., $CO_2$) per unit volume of absorbent.

Figure 12:
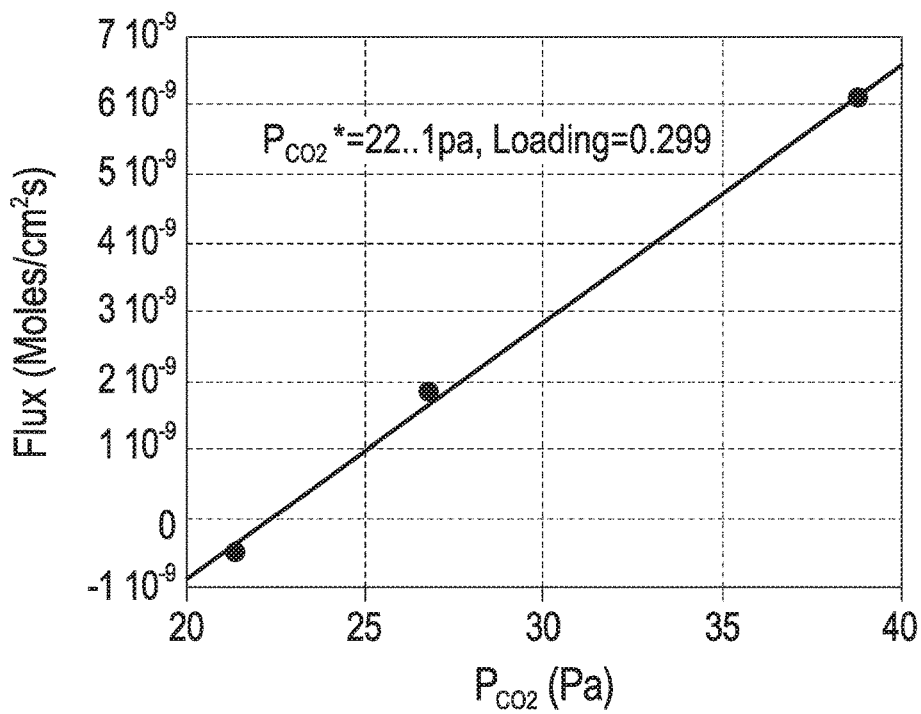
FIG. 12 is a graph of flux versus pressure of working fluid $CO_2$ generated using a computer model of an embodiment of the present invention.

As shown in FIG. 12, heat flux is given in units of area and time. Thus, greater surface area of heat exchanger fins leads to higher reaction rates and allows for faster working fluid (e.g., $CO_2$) absorption and higher power generation. Moreover, this heat does not need to be transported or stored. It is available to go directly back to the working fluid that is about to be expanded in the expander (e.g., turbo-expander or piston). Alternatively, excess heat could be transferred to a secondary heat transfer fluid that could then be pumped to a site where heat is desired.

In some embodiments, the vacuum action of the intake side of the compressor will be sufficient to allow working fluid (e.g., $CO_2$) to be released from the absorbent. In these embodiments, this is an endothermic reaction and the absorbent will cool. However, the action of compressing the working fluid will generate heat. In some embodiments, this heat is removed to maintain efficiencies. Further, the absorbent cannot cool indefinitely, so as the absorbent cools, heat generated in the compressor heats the absorbent. The heat going to the absorbent may drive the endothermic reaction and facilitate the release of additional working fluid (e.g., $CO_2$) for compression. This continues until the working fluid (e.g., $CO_2$) tank is full or until it is desired to stop the recharging process.

Accordingly, systems of the present invention may be charged or discharged and reversed at any part of the cycle. These systems may also be run at any power level even its maximum power right to the very end of the cycle. It may be discharged to 100% depth of discharge as often as desired and at full power as well with no detrimental effects to the system.

In some embodiments, during the recharge cycle, as the working fluid (e.g., $CO_2$) is being released from the absorbent, some absorbent may become entrained in the working fluid. Should this be the case, an optional separator 24 may be placed between the absorbent reservoir and the intake to the expander (e.g., turbo-expander). In some embodiments, such as the embodiment illustrated in FIGS. 6A and 6B, the separator is a centrifugal or cyclonic separator. In other embodiments, the separator may comprise a simple demister or filter.

Figure 13:
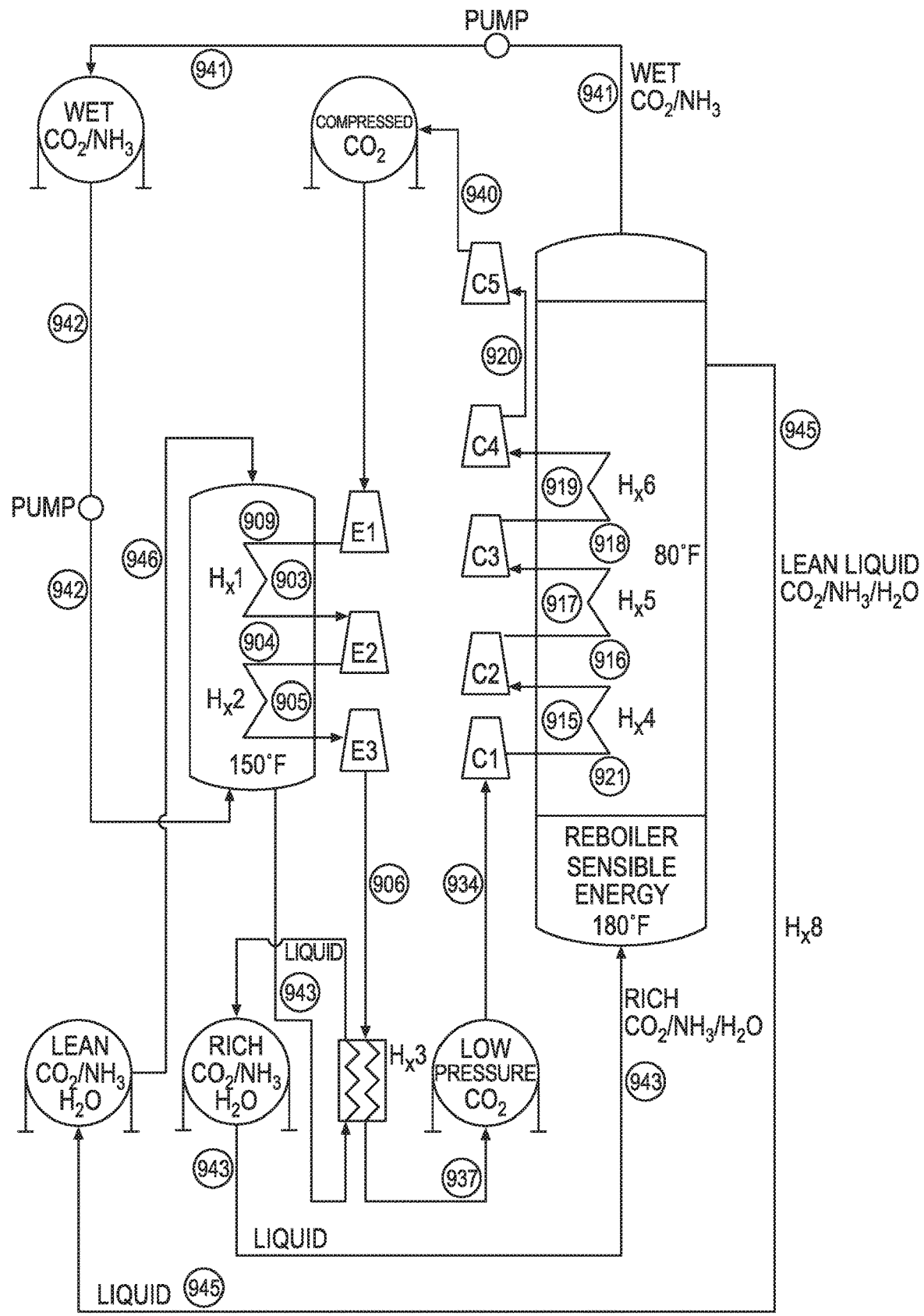
FIG. 13 is a schematic process flow diagram using separate working fluid and adsorption/desorption streams in accordance with the present invention.

Another embodiment of the mechanical-chemical energy storage system is described in the schematic diagram shown in FIG. 13. This closed loop system contains several loops. In this embodiment, to avoid any corrosion of compressor blades, precautions are taken to prevent the entry of absorbent (e.g., ammonia) or working fluid-absorbent mixture (e.g., carbon dioxide ammonia mixture) into compressors. Starting with the fully charged system, high pressure carbon dioxide (labeled "high pressure $CO_2$") expands through an expansion device or series of expansion devices E1-E3 to generate power. Examples of suitable expansion devices include turbo-expanders.

In one loop, the expanded working fluid (e.g., $CO_2$) or exhaust from the expansion device travels through heat exchanger (Hx3). Later, this low-pressure working fluid (e.g., $CO_2$ gas) labeled "low pressure $CO_2$" is compressed by one or more compressors C1-C5 returning to higher pressure carbon dioxide phase. During the compression of the carbon dioxide gas, which is an exothermic process, heat is captured by one or more heat exchangers $H_x4$-$H_x7$.

In another loop, the expanded working fluid or exhaust from the expansion device reacts with an absorber (e.g., aqueous ammonia (~36% solution)) in an exothermic reaction that generates heat while absorbing the working fluid (e.g., $CO_2$). Thus, this additional energy increases the enthalpy of the working fluid allowing for a greater energy production from this part of the cycle. Since the temperature of the absorbent is higher than the temperature of the cooling working fluid, energy will naturally flow in the desired direction shown by the arrow in the discharge portion of FIG. 13. Higher pressures and lower temperature of operation benefit reductions of absorbent (e.g., ammonia) concentration in the working fluid (e.g., $CO_2$) phase. This heat energy powers the transfer of the organic amine (e.g., aqueous ammonia) and working fluid (e.g., $CO_2$) solution to a reboiler kept to a temperature of about 180° F., wherein the solution separates into the working fluid (e.g., $CO_2$ gas) and the organic amine (e.g., aqueous ammonia). The partial amount of wet working fluid (e.g., $CO_2$) and absorbent (e.g., ammonia gas) is pumped into the heat exchanger chamber containing Hx1-Hx2. During this process further separation of working fluid (e.g., $CO_2$) and absorbent (e.g., ammonia) occurs and the gas passing through the heat exchanger Hx3 is essentially pure working fluid (e.g., $CO_2$). Later, this low-pressure working fluid (e.g., $CO_2$ gas) labeled "low pressure $CO_2$" is compressed by one or more compressors C1-C5 returning to higher pressure carbon dioxide. Thus, the working fluid (e.g., $CO_2$ gas) enters into the next cycle.

In another loop, the low concentration liquid working fluid and absorbent solution (e.g., $CO_2$ and ammonia solution) exiting the reboiler is circulated into the chamber containing Hx1 and Hx2 heat exchangers. Working fluid gas (e.g., $CO_2$ gas) is further separated from absorbent (e.g., ammonia) in this chamber and circulated via heat exchanger Hx3 into compressors C1-C5. Thus, the working fluid (e.g., $CO_2$) gas enters into the next cycle.

Figure 15A:
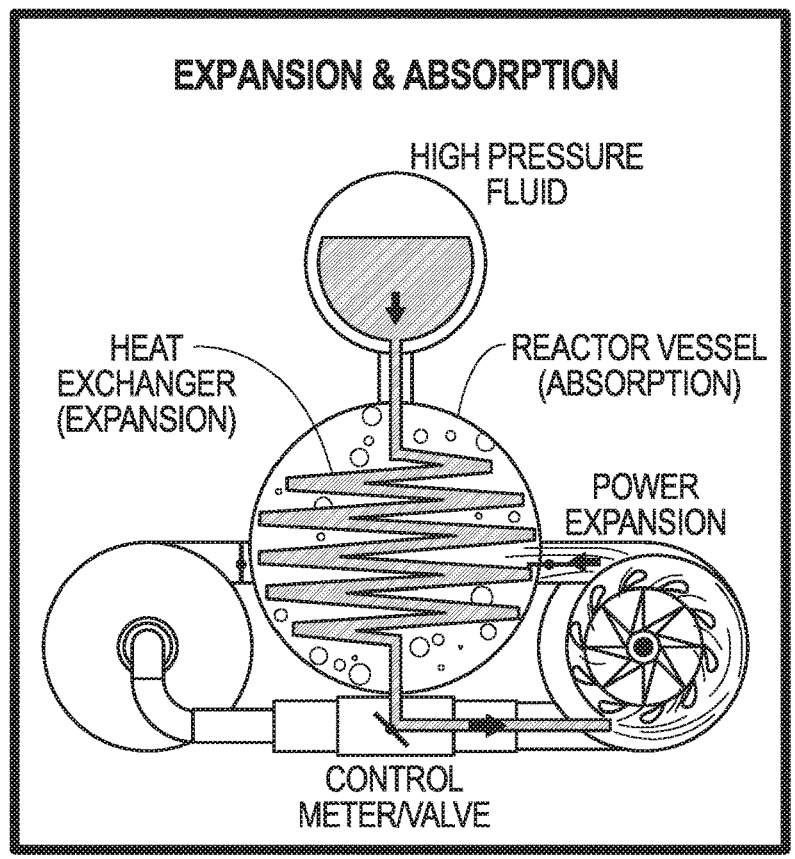
FIGS. 15A and 15B are schematics of a mechanical-chemical energy storage system according to the present invention.
Figure 15B:
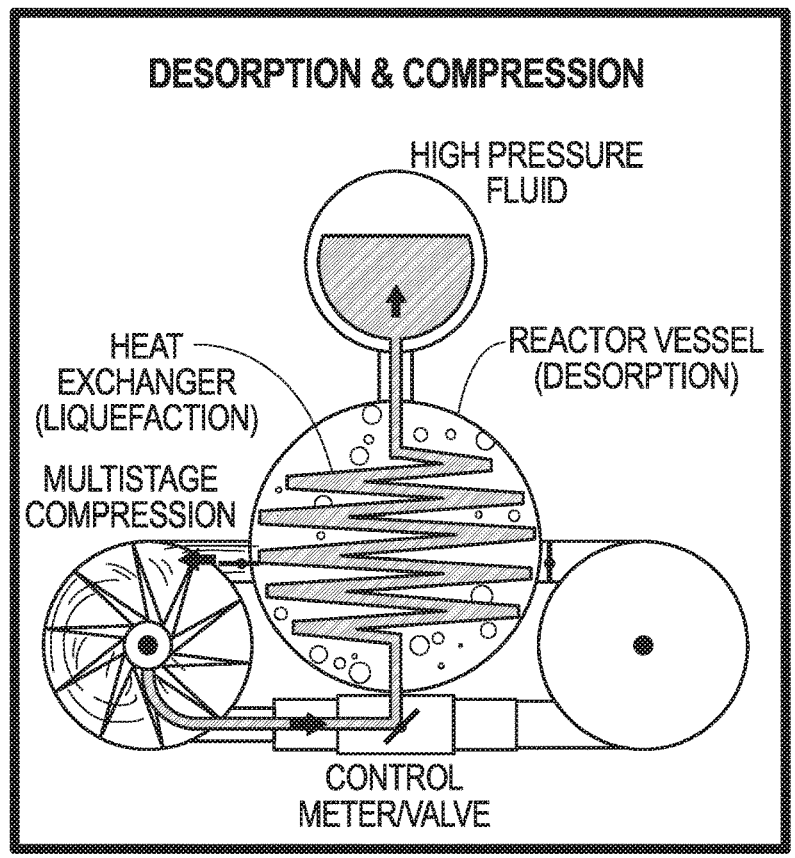

Another embodiment of the mechanical-chemical energy storage system is described in the schematic diagrams shown in FIGS. 15A and 15B. During discharging, high pressure working fluid undergoes expansion wherein the expander (e.g., a turbine or turbo-expander) can generate electrical energy when coupled with a generator. The expanded working fluid is absorbed by the absorbent in a reaction vessel. When the system is charged, the working fluid is separated from the absorbent and channeled to a multistage compressor wherein the working fluid is pressurized and returned to a working fluid tank as a high pressure working fluid. The heat generated during the compression of the working fluid may be transferred to the reaction vessel to power the release of the working fluid via a heat exchanger, or the heat may be transferred to high pressure working fluid before it is expanded through the expander.

Working Fluids

All suitable working fluids are within the scope of the invention. Suitable working fluids can be expanded and compressed and can be absorbed by an absorbent. Exemplary working fluids include fluids that can be compressed to a liquid, critical, or trans-critical state at the desired operating pressures and temperatures. For example, the desired temperature may be ambient temperature (about 20 to 25° C.) and the desired pressure range may be from about 40 to 60 bar, thus, exemplary working fluids would be in a liquid, critical, or trans-critical state at those conditions. Some exemplary working fluids will be absorbed by the absorbent in a reversible and/or exothermic process. Some specific exemplary working fluids include carbon dioxide ($CO_2$), ammonia ($NH_3$), nitrous oxide ($N_2O$), air, and water.

Examples of suitable working fluids are described in Table 1.

TABLE 1

| Working fluids. | | | |
|---|---|---|---|
| Working Fluid | Additive | Latent Heat of Fusion (J/g) | Melting Point (° C.) |
| Fatty Acids | | | |
| Hexadecane | Na Montmorillonite | 126 | — |
| Fatty acids | Surfactants | 191 | — |
| Oleic acid | CuO | — | — |
| Myristic acid | palmitic acid | 190 | 61 |
| Capric acid | — | 170 | 36 |
| Capric acid | Nanotubes | 75 | 36 |
| Lauric acid | — | 188 | 49 |
| Myristic acid | — | 201 | 61 |
| Palmitic acid | — | 185-220 | 67 |
| Stearic acid | — | 220 | 73 |
| Dodecanoic acid | — | 190 | 42 |
| Lauric acid/stearic acid | — | 131 | 33 |
| Stearic acid | Bentonite | 84 | 73 |
| Paraffins | | | |
| Paraffin | — | 173 | 64 |
| Paraffin waxes | Nanotubes | — | 60 |
| Paraffin | Graphite | 180 | 40 |
| Paraffin | $SiO_2$ | 110 | — |
| Paraffin | $Fe_2O_3$ | — | 47 |
| Paraffin | Siloxane | 160 | 35 |
| Nonacosane | — | 240 | 64 |
| Hexacosane | — | 257 | 56 |
| Organics | | | |
| Tetrabutylammonium clathrates | — | 200 | — |
| Tetradecanol | Graphite | 220 | 36 |
| Naphthalene | — | 148 | 80 |
| Erytritol | — | 340 | 118 |
| Camphene | — | 238 | 50 |
| 1,3-ditetradecanoyl thiourea | — | 126 | 48 |
| Salt Hydrates | | | |
| Glauber's salt ($Na_2SO_4*10H_2O$) | polyacrylomide | 270 | 32 |
| Glauber's salt ($Na_2SO_4*10H_2O$) | Gelatin | 248 | — |
| Hydrate salts $CaCl_2/MgCl_2 + SrCl_2$ | — | 103 | 21 |
| $Na_2CO_3*10H_2O$ | — | 247 | 33-36 |
| $NaHPO_4*7H_2O$ | — | 135-170 | 48 |
| $MgSO_4*7H_2O$ | — | 202 | 49 |
| $Ba(OH)_2*8H_2O$ | — | 265-280 | 78 |

TABLE 1-continued

Working fluids.

| Working Fluid | Additive | Latent Heat of Fusion (J/g) | Melting Point (° C.) |
|---|---|---|---|
| $CH_3COONa*3H_2O$ | — | 270-290 | 58 |
| $CH_3COONa*3H_2O$ | Graphite | — | — |
| $NaOH*H_2O$ | — | 272 | 58 |
| Eutectic Mixtures | | | |
| Naphthalene + Benzoic acid | — | 123 | 67 |
| $AlCl_3$ + NaCl + $ZrCl_2$ | — | 234 | 68 |
| Long Chain Polymers | | | |
| PEO | carbon black | 120-170 | 60 |
| PEO | Graphite | 130-160 | 60 |
| PEO | carbon fibers | 140-180 | 60 |
| PEO | Fullerenes | 160-180 | 60 |
| PEO | SWCNT | 150-180 | 60 |
| PEO | Cellulose | 40-130 | 60 |
| PEO | Starch | 47-97 | 60 |
| PEG | Chitosan | 140 | ~50 |
| PEG | Cellulose | 60 | ~50 |
| PEG 35,000 | — | 167 | 68 |
| PEG 35,000 | lauric acid | 186 | 43-56 |
| PEG 3400 | lauric acid | 188 | 43-54 |
| Dissolved Gases[1] | | | |
| $SO_3$ | — | 331 | 62 |
| $CO_2$ | — | — | — |
| $NH_3$ | — | — | — |
| $N_2O$ | — | — | — |
| halons | — | — | — |
| alcohol vapor | — | — | — |
| gaseous hydrocarbons | — | — | — |
| freons | — | — | — |
| Molten Salts | | | |
| $Na_2SO_4*10H_2O$ | — | — | 32.4 |
| Solid PCM | | | |
| Pentaglycerin | — | 192 | 81 |
| 2-amino-2-methyl-1,3-propanediol | — | 264 | 78 |
| Misc. Materials | | | |
| oleochemical carbonates | — | 144-227 | from −6 to 47 |

[1]Possible solvents for freons, hydrocarbons and Nitrous oxide include butanediammine, 2-diethylamino ethanol, aqueous Na glycinate solution, diethanolamine, olive oil, aqueous hydroxide solution, dodecane, ammonia water, amine based solvent (e.g., Stonvent), vegetable oil, paraffins, or any combination thereof.

Absorbents

All suitable absorbents are within the scope of the invention. Suitable absorbents agents are capable of chemically absorbing a working fluid. Exemplary absorbents will absorb the working fluid in a reversible and/or endothermic process. Some specific exemplary absorbents include: absorbents of carbon dioxide, such as organic amines (e.g., monoethanolamine (MEA), piperazine, ammonia, morpholine, diethanolamine, diglycolamine, diisopropanolamine, triethanolamine, dibutylamine, methyl-diethanolamine, or diethylenetriamine), inorganic bases (e.g., potassium carbonate, ammonium carbonate), activated carbon, silica gel, zeolites, and metal organic frameworks; absorbents of ammonia, such as salts that form ammonates, halide salts (e.g., magnesium chloride ($MgCl_2$), calcium chloride ($CaCl_2$)), mild acids, water, activated carbon, silica gel, zeolites, and metal organic frameworks; absorbents of nitrous oxide, such as oils that dissolve nitrous oxide (e.g., food oils, silicone oils), activated carbon, silica gel, zeolites, and metal organic frameworks; and absorbents of air such as activated carbon and zeolites. The terms "absorption agent", "absorbent", and "sorbent" are used interchangeably and may each refer to either a liquid or a solid agent that can absorb or adsorb a fluid, respectively.

Examples of pairs of absorbents and working fluids suitable for use in the present invention are described in Table 2.

TABLE 2

Working fluids and absorbents.

| Working Fluid | Absorbent | $H_{ads}$, (kJ/mole) | Pressure |
|---|---|---|---|
| $CO_2$ | $CO_2$ silicas | ~5-15 | — |
| | $CO_2$ organic and inorganic carbonates | ~1-40 | — |
| | $CO_2$ absorbent carbons | ~5-15 | — |
| | $CO_2$ clays | ~5-5 | — |
| | $CO_2$ aluminas | ~5-15 | — |
| | $CO_2$ zeolites | ~5-15 | — |
| | $CO_2$ amine and methyl substituted MOF | <5 | ~1 bar |
| | $CO_2$ various coals | ~12-13 | up to 200 bar |
| | $CO_2$ MOF | ~16-20 | — |
| | $CO_2$ carborane based MOF | ~22 | up to 10 bars |
| | $CO_2$ DABCO based MOF | ~20-24 | up to 25 bars |
| | $CO_2$ MOF | ~22-24 | — |
| | $CO_2$ Au | in range of 22-26 | — |
| | $CO_2$ zeolitic imidazolate | ~21-30 | — |
| | $CO_2$ modified MOF | ~26 | — |
| | $CO_2$ MOF BTC framework | 27-37 | — |
| | $CO_2$ carbon sorbent | 28-25.7 | ~1 bar |
| | $CO_2$ Cr-phthalate | ~30 | up to 30 bar |
| | $CO_2$ Zeolite 13X | ~31 | ~2 bar |
| | $CO_2$ MOF | ~33, ~22 | up to ~5 bar |
| | $CO_2$ chabazite | ~35 | — |

TABLE 2-continued

Working fluids and absorbents.

| Working Fluid | Absorbent | $H_{ads}$, (kJ/mole) | Pressure |
|---|---|---|---|
| $CO_2$ | fluoro-functionalized metal oxide framework | ~45 decreasing to ~30 | — |
| $CO_2$ | metal oxide framework | ranges from 16-41 | 1-50 bar |
| $CO_2$ | silica foam | 43 | up to 1 bar |
| $CO_2$ | unsaturated metal centers | 22, 32, 45, 47-52, 44-54 | — |
| $CO_2$ | zeolite 13X and $Mg_2$(dobdc) | 46 and 41 respectively | 1 bar |
| $CO_2$ | molecular porous material | ~47 | — |
| $CO_2$ | benzene-dicarboxylate | 30-50 | — |
| $CO_2$ | methyl diethanolamine (aq) | ~50-58 | — |
| $CO_2$ | ionic liquids | 80 | 2-3 bar |
| $CO_2$ | chabazite zeolites | — | up to ~10 bar |
| $CO_2$ | hydromagnesite | — | — |
| $CO_2$ | imidazolium based ionic liquids | — | up to ~20 bar |
| $CO_2$ | MOF | — | 0-5 bar |
| $CO_2$ | Zn(II)-cyclen | — | — |
| $CO_2$ | silicon nitride | — | — |
| $CO_2$ | TBAB (aq) | — | — |
| $CO_2$ | Triethylbutylammonium Acetate | — | — |
| $CO_2$ | porous organic polymers | — | — |
| $CO_2$ | clathrate hydrates | — | — |
| $CO_2$ | aminosilicates | — | — |
| $CO_2$ | Hydrated salts | — | — |
| $CO_2$ | MOF 177 | — | up to 20 bar |
| $CO_2$ | Triethylbutyl ammonium acetate | — | — |
| $CH_4$ | $CH_4$ various carbons | ~10-11 | — |
| | $CH_4$ various coals | ~10-11 | — |
| | $CH_4$ MOF | ~11-12 | — |
| | $CH_4$ zeolites | ~14 decreasing to ~6 | 90 bar |
| | $CH_4$ carborane based MOF | ~15 | 20 bar |
| | $CH_4$ zeolite 13X | 15 | ~2 bar |
| | $CH_4$ DABCO based MOF | ~14 to ~18 | 25 bar |
| | $CH_4$ zeolite templated carbon | 16-20 | — |
| | $CH_4$ MOF | ~21, ~18 | up to ~5 bar |
| $NH_3$ | $NH_3$ salt ammonates ($CaCl_2$*$6NH_3$) | 5-45 | — |
| | $NH_3$ thiocyanate | — | — |
| | $NH_3$ ammonia borane | — | 1-4 bars |
| | $NH_3$ $CaCl_2$ - vermiculite | ~40 | up to 4 bar |
| | $NH_3$ $SrCl_2$ - amine | ~33 | ~2 bar |
| | $NH_3$ $MgCl_2$ | 55-87 | 5 bar |
| $NO_2$ | $NO_2$ biochar | 20-27 for biochar, ~10 for $Al_2O_3$, $Fe_2O_3$ and peat | ~1 bar |
| CO | CO DABCO based MOF | ~10 to ~12 | 25 bar |
| | CO MOF | ~45, ~23 | up to ~5 bar |
| | CO Ni or Fe powder | — | — |
| | CO CO complexes | — | — |
| Ar, $N_2$, $O_2$ | Ar, $N_2$, $O_2$ carbon sorbent | 16-17 | ~1 bar |
| $H_2$ | $H_2$ zeolite | 3.5 and higher | — |
| Ne | Ne chabazite | ~5 | — |
| Ar | Ar chabazite | ~15 | — |
| | Ar various coals | ~14-16 | — |
| ethylene + ethane | ethylene + ethane NaX zeolite | 28-40 | — |
| $N_2$ | $N_2$ various coals | ~8 | — |
| freons, halons | freons, halons various carbons | ~8 | — |
| | freons, halons various silicas | ~8 | — |

TABLE 2-continued

Working fluids and absorbents.

| Working Fluid | Absorbent | $H_{ads}$, (kJ/mole) | Pressure |
|---|---|---|---|
| | freons, halons | various zeolites | ~8 | — |
| | freons, halons | various clays | ~8 | — |
| | freons, halons | various MOF's | ~8 | — |
| | freons, halons | various aluminas | ~8 | — |
| | freons, halons | graphene | ~8 | — |
| | freons, halons | graphite oxide | ~8 | — |
| | freons, halons | various MOF's | ~8 | — |
| | freons, halons | various MOF's | ~8 | — |
| NO | NO | NO complexes | ~10-20 | — |
| $H_2O$ | $H_2O$ | salt hydrates | 5 to 45 | — |
| | $H_2O$ | silcas | 5 to 45 | — |
| | $H_2O$ | zeolites | 5 to 45 | — |
| | $H_2O$ | aluminas | 5 to 45 | — |
| | $H_2O$ | various MOF'scarbons | 5 to 45 | — |
| | $H_2O$ | inorganic and organic oxide-hydroxides both | 5 to 45 | — |

III. Mechanical Chemical Energy Storage Methods

One aspect of the invention relates to a method for storing energy comprising: providing an absorbent reservoir containing a working fluid that is chemically absorbed by an absorbent; desorbing the working fluid from the absorbent in an endothermic process; and condensing the working fluid in an exothermic process and transferring the condensed working fluid to a working fluid reservoir under pressure; wherein at least some of the heat generated during the condensing step is recycled to drive the desorbing step.

In some implementations, the working fluid comprises carbon dioxide, ammonia, nitrous oxide, air, or water.

In some implementations, the working fluid comprises carbon dioxide or ammonia.

In some implementations, the absorbent comprises an organic amine, an inorganic base, an activated carbon, silica gel, a zeolite, a metal organic framework, or any combination thereof.

In some implementations, the absorbent comprises an organic amine selected from monoethanolamine, piperazine, ammonia, morpholine, diethanolamine, diglycolamine, diisopropanolamine, triethanolamine, dibutylamine, methyldiethanolamine, diethylenetriamine, or any combination thereof. For example, the absorbent comprises monoethanolamine (MEA). In some implementations the absorbent comprises a mixture of MEA and water.

In some implementations, the working fluid comprises ammonia.

In some implementations, the absorbent comprises a metal halide salt, a mild acid, water, activated carbon, silica gel, a zeolite, or metal organic framework.

In some implementations, the working fluid comprises nitrous oxide.

In some implementations, the absorbent comprises a food oil, silicone oil, activated carbon, silica gel, zeolite, or metal organic framework.

In some implementations, the heat generated from the condensing step is recycled to drive the desorbing step using a heat exchanger.

In some implementations, the method further comprises compressing the working fluid using a reversible turbine.

In some implementations, the method further comprises compressing the working fluid and storing the working fluid in the working fluid reservoir in a liquid state, a critical state, or a trans-critical state.

In some implementations, the working fluid is compressed to and stored at a pressure of from about 1 bar to about 200 bar (e.g. 10 bar to 100 bar, or about 50 bar).

In some implementations, the method further comprises a second compression stage after the first compression.

In some implementations, the working fluid is expanded to a pressure of from about 0.1 bar to 10 bar (e.g., about 0.5 bar to about 5 bar, or about 1 bar).

In some implementations, the working fluid is stored at ambient temperature.

In some implementations, the method further comprises heating the working fluid prior to expansion using an outside heat source.

Another aspect of the invention relates to a method of charging and discharging an energy storage system comprising: (1) charging the system comprising: providing an absorbent storage tank containing a working fluid that is chemically absorbed by an absorbent; desorbing the working fluid from the absorbent in an endothermic process; condensing the working fluid in an exothermic process and transferring the condensed working fluid to a working fluid reservoir under pressure; and recycling heat generated during the condensing step to drive the desorbing step; and storing the working fluid in a working fluid reservoir under pressure; and (2) discharging the system comprising: expanding the working fluid; chemically absorbing the working fluid with the absorbent in the absorbent reservoir in an exothermic process; recycling heat generated during the absorption reaction to drive the expanding step; and storing the absorbent and the absorbed working fluid in the absorbent reservoir.

In some implementations, the working fluid comprises carbon dioxide, ammonia, nitrous oxide, air, or water.

In some implementations, the working fluid comprises carbon dioxide.

In some implementations, the absorbent comprises an organic amine, inorganic base, activated carbon, silica gel, zeolite, or metal organic framework.

In some implementations, the absorbent comprises an organic amine selected from monoethanolamine, piperazine, ammonia, morpholine, diethanolamine, diglycolamine, diisopropanolamine, triethanolamine, dibutylamine, methyldiethanolamine, or diethylenetriamine. For example, the absorbent comprises monoethanolamine (MEA). In some implementations the absorbent comprises a mixture of MEA and water.

In some implementations, the working fluid comprises ammonia.

In some implementations, the absorbent comprises a metal halide salt (e.g., $MgCl_2$, $CaCl_2$), mild acid, water, activated carbon, silica gel, zeolite, or metal organic framework.

In some implementations, the working fluid comprises nitrous oxide.

In some implementations, the absorbent comprises a food oil, silicone oil, activated carbon, silica gel, zeolite, or metal organic framework.

In some implementations, the heat generated during the condensing step is recycled drive the desorbing step using a heat exchanger.

In some implementations, the working fluid is compressed by a reversible turbine.

In some implementations, the method further comprises compressing the working fluid and storing the working fluid in the working fluid reservoir in a liquid state, a critical state, or a trans-critical state.

In some implementations, the working fluid is compressed to and stored at a pressure of from about 1 bar to about 100 bar, (e.g. from about 10 bar to about 100 bar, from about 20 bar to about 80 bar, or about 50 bar).

In some implementations, the compressing step comprises a two-stage compression process.

In some implementations, the working fluid is expanded to a pressure of from about 0.1 bar to 10 bar (e.g. about 1 bar).

In some implementations, the working fluid is stored at ambient temperature.

In some implementations, the method further comprises heating the working fluid prior to expansion using an external heat source.

In some implementations, the method further comprises directing the flow of the working fluid a first direction during charging, and reversing the flow of the direction of the working fluid during discharging.

Figure 14A:
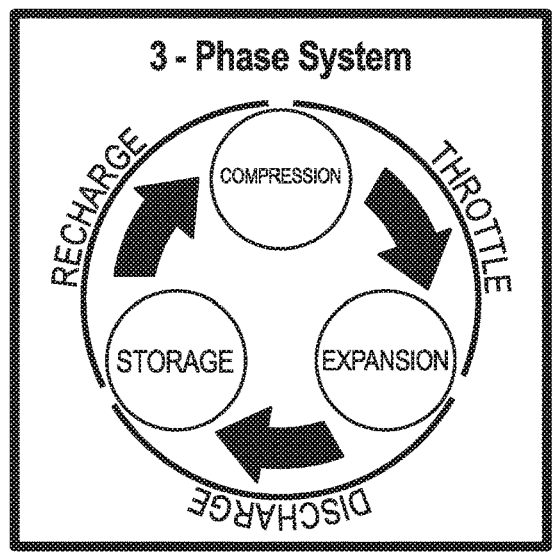
FIGS. 14A-14C are schematics of the processes involved in the charge, discharge, and throttle cycles in accordance with the present invention.
Figure 14B:
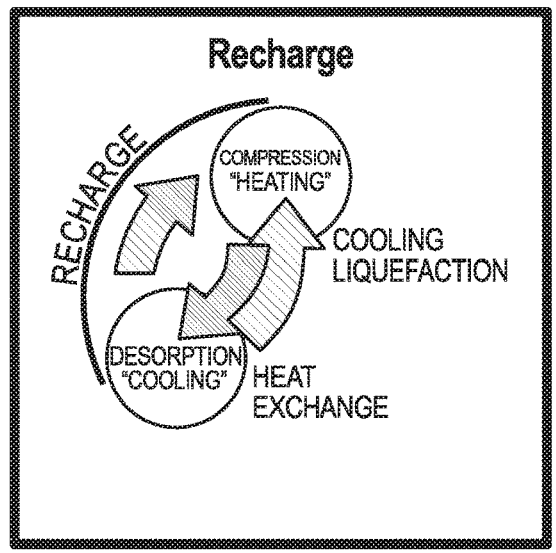
Figure 14C:
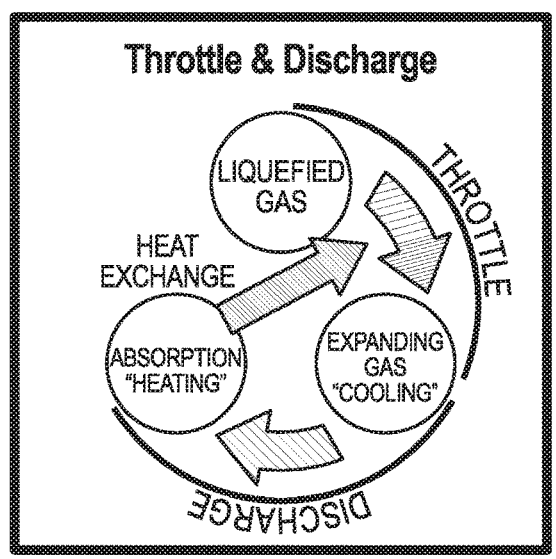

Another aspect of the mechanical-chemical energy storage systems of the present invention are illustrated in FIGS. 14A-14C. Starting with a fully charged system, as shown in FIG. 14C, the system uses $CO_2$ as a working fluid, but it is not limited to this working fluid. There is a full tank of a liquefied or supercritical $CO_2$ labeled "liquefied gas" that is expanded through an expansion device such as a turboexpander to generate power. As the working fluid expands, its enthalpy reduces and it cools. The exhaust form the expansion device is now reacted with an absorber, such as an organic amine, such as MEA, that generates heat while absorbing the $CO_2$. This heat is beneficially used by transfer to the cooling $CO_2$ gas on the input side of the turboexpander. Thus, this additional energy increases the enthalpy of the working fluid allowing for a greater energy production from this part of the cycle. Since the temperature of the absorbent medium is higher than the temperature of the cooling working fluid, energy will naturally flow in the desired direction shown by the arrow in the discharge portion of FIG. 14C. This process may continue at any desired rate or rates until all of the $CO_2$ or other working fluid has been removed from the tank. It is however, not necessary to completely discharge the tank, if it is desired to start a recharge cycle. It may be reversed at any time that is desired.

When it is desired to recharge the system, the reverse process is shown in the charge portion of FIG. 14B. Here, energy is input to reverse the chemical reaction and release the working fluid as a gas, which lowers the enthalpy of the absorbent. The working fluid gas is then compressed to the pressure required to create a liquid or supercritical fluid. During this compression, heat is generated. Recovering this heat via the use of a heat exchanger raises the RTE of the system. This heat is transferred to the absorbent(s). This heat continues to drive the release of the working fluid from the absorbent. This process may be continued at any desired rate or rates until the working fluid (e.g., $CO_2$) tank is full. In this embodiment, it is not necessary to completely recharge the tank. If it is desired to start a discharge cycle before the filling of the working fluid tank, the cycle may be reversed before the working fluid tank is full.

Figure 16:
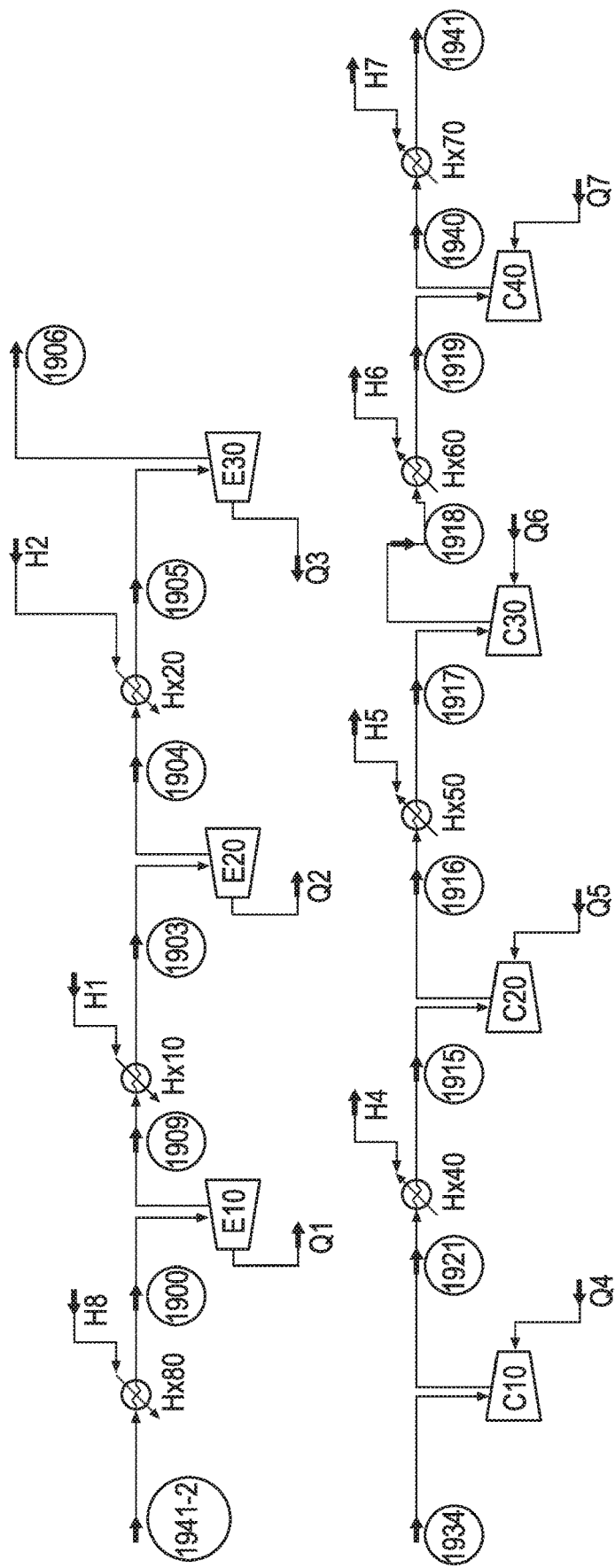
FIG. 16 is a schematic of the processes involved in the charge and discharge of a mechanical-chemical energy storage system according to the present invention.
Figure 17A:
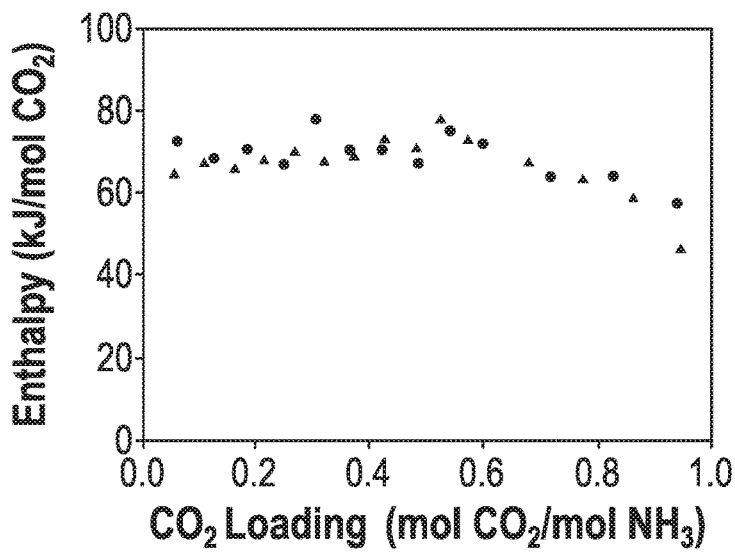
FIG. 17A is a graph showing differential enthalpies of absorption of carbon dioxide in 2.5 wt % aqueous ammonia in a reactor at 40° C.
Figure 17B:
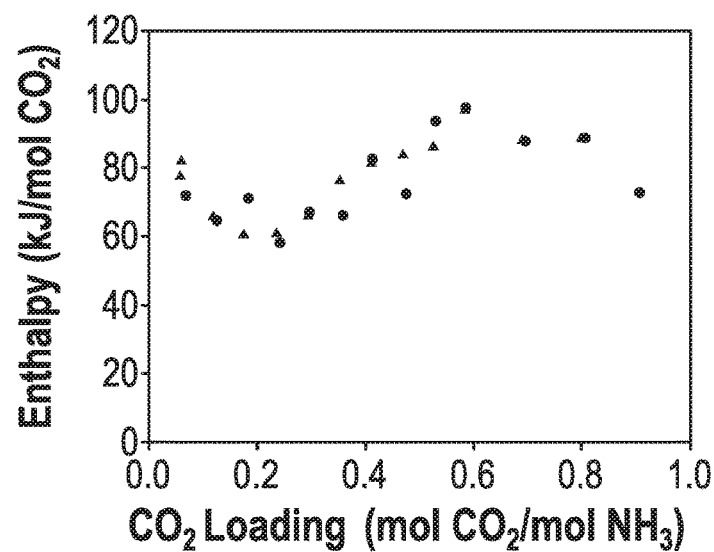
FIG. 17B is a graph showing differential enthalpies of absorption of carbon dioxide in 2.5 wt % aqueous ammonia in a reactor at 60° C.
Figure 17C:
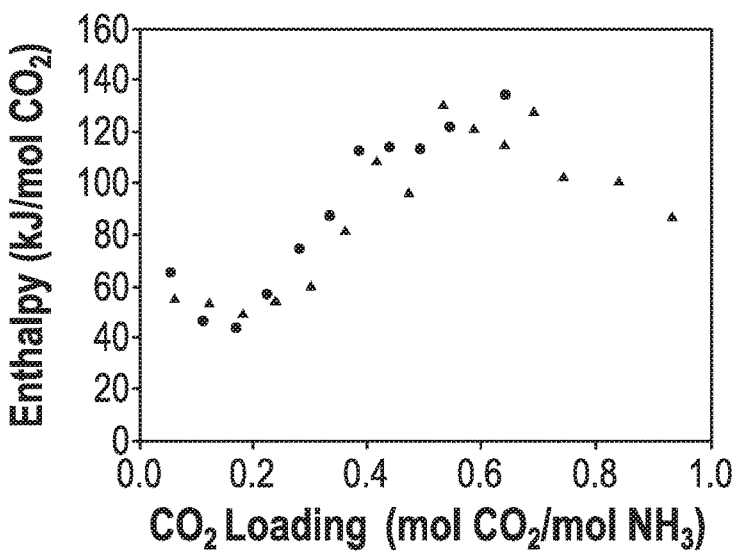
FIG. 17C is a graph showing differential enthalpies of absorption of carbon dioxide in 2.5 wt % aqueous ammonia in a reactor at 80° C.

Another aspect of the present invention provides a method of storing energy using mechanical-chemical energy storage system is described in FIG. 16. This implementation comprises charging the system by compressing a working fluid (e.g., $CO_2$) in a series of compressors C10-C40, i.e., multi-stage compression, and storing the compressed working fluid in a working fluid tank. Charging, according to this implementation, also comprises removing or transferring the heat generated during the multi-stage compression from the working fluid using heat exchangers Hx40-Hx70 that are arranged between compressors or operated between successive compression stages.

Some implementations further include discharging energy from the mechanical-chemical energy storage system. Discharging energy from this system comprises expanding the working fluid through expanders (e.g., turbines, turbo-expanders, pistons, or any combination thereof) E10-E30. One or more heat exchangers Hx80, Hx10, and Hx20 transfer heat to the working fluid. The one or more heat exchangers are arranged to input heat to the working fluid between successive expansions. In some instances, the heat exchangers are arranged along the working fluid flow path between expanders. Alternatively, a single heat exchanger can input heat to the working fluid between successive expansions.

IV. Examples

Example 1: Ammonia and Magnesium Chloride

Magnesium chloride can form ammonates. $MgCl_2$ can absorb up to 6 molecules of ammonia to form $MgCl_2*6NH_3$.

The pressure of the ammonia over the $MgCl_2$ varies as more or less ammonia is incorporated into the molecular structure. Since the salt and its ammonate are solid, the heat generated from the reaction needs to be allowed to move to the cooling ammonia by either packing the salt on one side of a heat exchanger and having the ammonia on the other side of the same heat exchanger or by having an intermediate heat transfer fluid carry the heat away from the salt and deliver it to the ammonia.

Simplified chemical equations representing these reactions include:

$$MgCl_2 + NH_3 \Rightarrow MgCl_2 * NH_3 \tag{1}$$

$$MgCl_2 * NH_3 + NH_3 \Rightarrow MgCl_2 * 2NH_3 \tag{2}$$

$$MgCl_2 * 2NH_3 + NH_3 \Rightarrow MgCl_2 * 3NH_3 \tag{3}$$

$$MgCl_2 * 3NH_3 + NH_3 \Rightarrow MgCl_2 * 4NH_3 \tag{4}$$

$$MgCl_2 * 4NH_3 + NH_3 \Rightarrow MgCl_2 * 5NH_3 \tag{5}$$

$$MgCl_2 * 5NH_3 + NH_3 \Rightarrow MgCl_2 * 6NH_3 \tag{6}$$

As $NH_3$ pressure is increased all of the above reactions will go to completion (to the right). This is the case as the system is discharging.

These are also all exothermic reactions. Thus, the heat that is released can be used to expand the ammonia to get addition energy from the system. Note that this heat energy is generated when and as the system discharges. It is not stored as heat but used right away to create more energy and increase the efficiency of the system.

Further, removing ammonia during the recharge step will drive the reactions to the left and create a source of cold to help with the liquefaction of ammonia. Again this cold is not stored as a cold material but is generated as the recharging process takes place.

In this case, the vacuum at the intake of the compression device could be sufficient to start removing ammonia from the $MgCl_2*NH_3$ and drive the recharge reaction. The additional heat from the compression of the ammonia can also drive the release of the ammonia until the recharging is complete.

Example 2: Carbon Dioxide and Monoethanolamine

Monoethanolamine (MEA), usually as a 30% solution in water, has been used for many years for removal of $CO_2$ from natural gas.

The simplified chemical equations representing these reactions include:

$$CO_2 + H_2O \Rightarrow HCO_3^- + H^+ \tag{7}$$

$$MEA + HCO_3^- \Rightarrow MEAHCO_2^- + H_2O \tag{8}$$

These reactions are exothermic and give off heat as $CO_2$ is absorbed. These are essentially simple acid-base reactions that are easily reversible since they are not too exothermic.

The fact that a gas is part of the equilibrium helps the reaction be driven in either direction by change of gas pressure. This allows for the storage of energy as chemical potential and allows for the control of this reaction by pressure and temperature.

Thus, as $CO_2$ exits the turbo-expander, the equilibrium in reaction 7 is pushed to the right, which also pushes reaction 8 to the right, releasing heat energy as needed to expand the $CO_2$ further.

FIGS. 7A and 7B shows one possible configuration of a heat exchanger for transferring heat. In the embodiment of FIGS. 7A and 7B, MEA (absorbent) is allowed to fall over the outer fins of a heat exchanger. While the $CO_2$ gas (working fluid) is allowed to react with the MEA in the same area. The high surface area fins increase the reaction rate by exposing a greater amount of MEA to the $CO_2$. As the MEA and $CO_2$ react, the heat is then directly available to any fluid inside the pipes of the heat exchanger. This can be the pressurized $CO_2$ going into the turbo-expander or it can be an intermediate heat exchange fluid (such as water) that can be pumped where the heat is desired.

Figure 18:
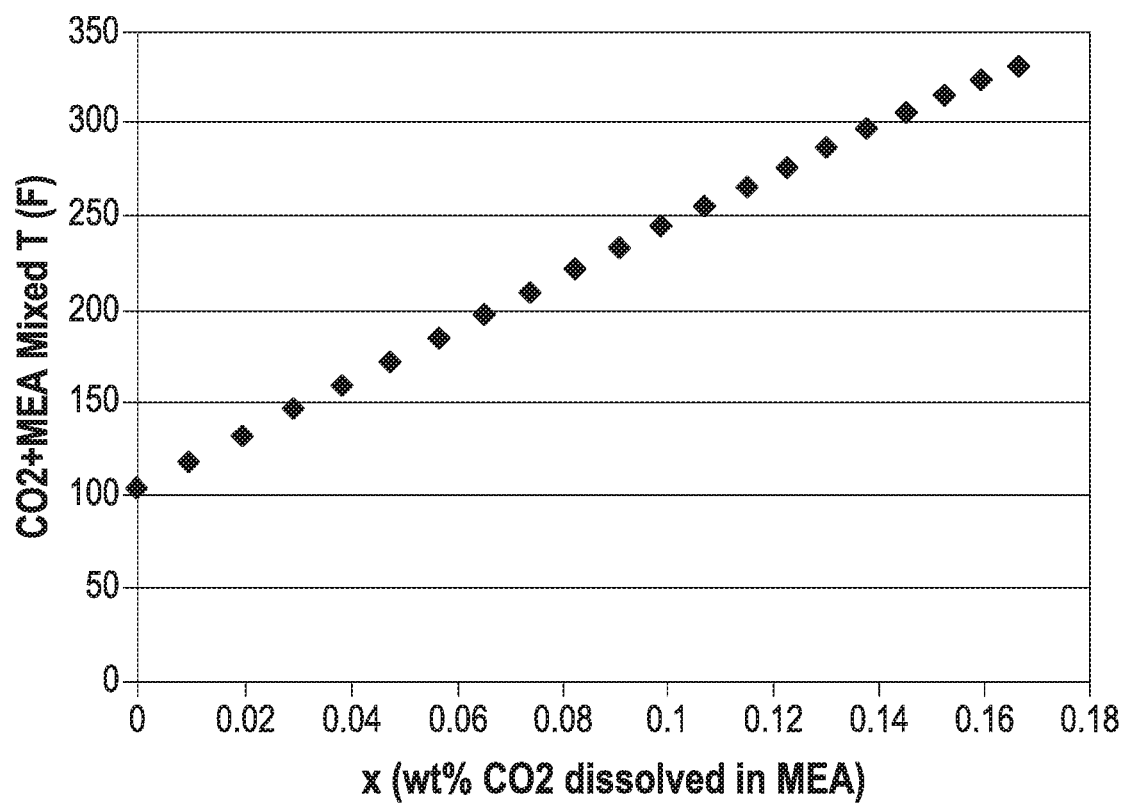
FIG. 18 is a graph of temperature of the absorbed $CO_2$/MEA mixture as a function of the weight percent of $CO_2$ absorbed in MEA, generated using a computer model of an embodiment of the present invention.

FIG. 18 is a typical graph showing the rate of $CO_2$ absorption per unit area and time. FIG. 9 is a typical loading graph showing how much $CO_2$ can be absorbed at various pressures.

These relationships, shown in FIGS. 18 and 9, can be used to design systems with a $CO_2$ working fluid. The power and absorption rate can be calculated using FIG. 12 for the particular absorbent and pressure temperature ranges. The required amounts of $CO_2$ and (in this case MEA) can be calculated by determining how many moles of $CO_2$ are absorbed and released under the intended operating conditions of the system.

As an example, a system may have a vacuum side of the compressor that will operate at 100 pascals and will charge the MEA up to 100,000 pascals. The amount of $CO_2$ can then be calculated by finding those two points on the graph where the line crosses and reading down to how much $CO_2$ is absorbed by the MEA at those pressures. In this case, when charging at 100,000 pascals, the mole ratio is about 0.6 moles of $CO_2$ per mole of MEA. Down at the lower pressure the ratio is about 0.2 to 1. These two ratios are subtracted and it is determined that the capacity of the MEA operation between these pressures will cycle at about 0.4 moles of $CO_2$ per mole of amine. It should be noted that these curves are at a single temperature.

FIG. 10 shows that if the temperature is shifted in the correct direction that the capacity can also be increased. As the absorber is being charged if its temperature is lowered it will absorb more $CO_2$ at any given pressure. This is of course precisely what the invention does while the system is discharging. Further, as the absorbent is heated it will release more $CO_2$ than would otherwise be released at that same pressure. This is also precisely what happens during recharge when we would want more pressure at the intake side of the compressor.

FIG. 10 shows the pressure of $CO_2$ at 40 and 60° C. over MEA/PZ. As can be seen by the two lines in FIG. 10, at all points, the pressure of $CO_2$ at 60° C. is greater than that of $CO_2$ at 40° C. Thus, by cooling the MEA during absorption and heating during desorption and by using the chemical potential of the MEA reaction, the efficiency of the system is maximized. This graph also shows that an increase of about 0.2 moles of $CO_2$ per mole of amine can be obtained by swinging the temperatures between 40° C. and 60° C. during the discharge and recharging, respectively.

FIG. 11 shows an example of advanced metal organic frameworks (MOFs) and activated carbon. These materials have a high capacity for storage of carbon dioxide at room temperature. These materials have a wide range of pressures to choose from for design considerations and are in some cases capable of absorbing over 100% of their own weight in $CO_2$.

Example 3: Process Simulation No. 1—($CO_2$/MEA)

In order to simulate an exemplary process, a CHEMCAD simulation software package was used. The process was simulated in sections rather than in a single simulation to allow for the use of different models for the fluid properties in certain segments of the process. Initial simulations were performed assuming a constant $CO_2$ mass flow rate (1 lb/sec) and assuming negligible carryover of any impurities or sorbents through the expansion/contraction steps. It is also assumed that the heat of solution of the $CO_2$ and sorbent is capable of heating the solution to the fixed set point temperature for the calculation. Therefore, it must be noted that the highest temperatures in the simulations below may not be achievable without additional heat input (this will be discussed further).

Figure 19:
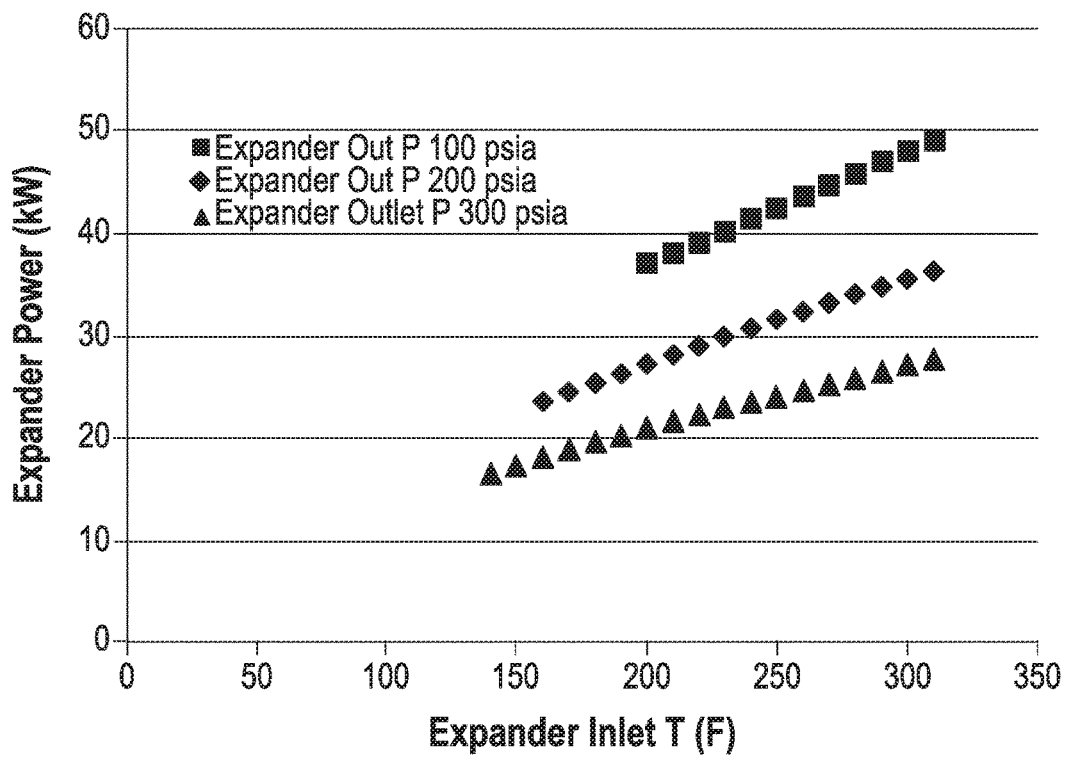
FIG. 19 is a graph of expander power as a function of inlet temperature at several outlet pressures, generated using a computer model of an embodiment of the present invention.

Using a single stage expander, FIG. 19 shows the variation of expander power output at varying process conditions. As would be expected, greater power output occurs at higher inlet temperatures and at larger pressure drops across the expander. For the expander, it is preferred to maximize the power output during the discharge step.

Figure 20:
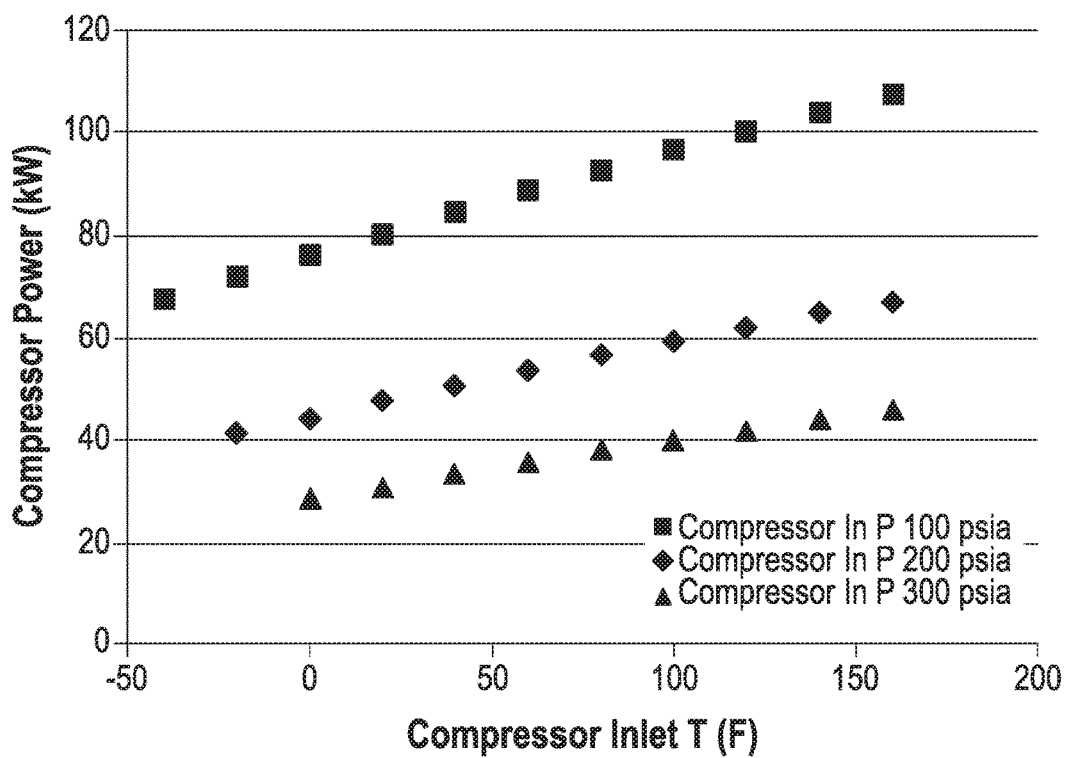
FIG. 20 is a graph of compressor power as a function of inlet temperature at several inlet pressures, generated using a computer model of an embodiment of the present invention.

Referring to FIG. 20, a similar study was performed with the compressor. Similar results were obtained as to the expander; higher temperatures lead to higher power inputs to compress the $CO_2$, and a greater pressure difference across the compressor requires greater power input. Compression occurs during the recharge step, so it is preferred to minimize the power input to repressurize the $CO_2$.

Figure 21:
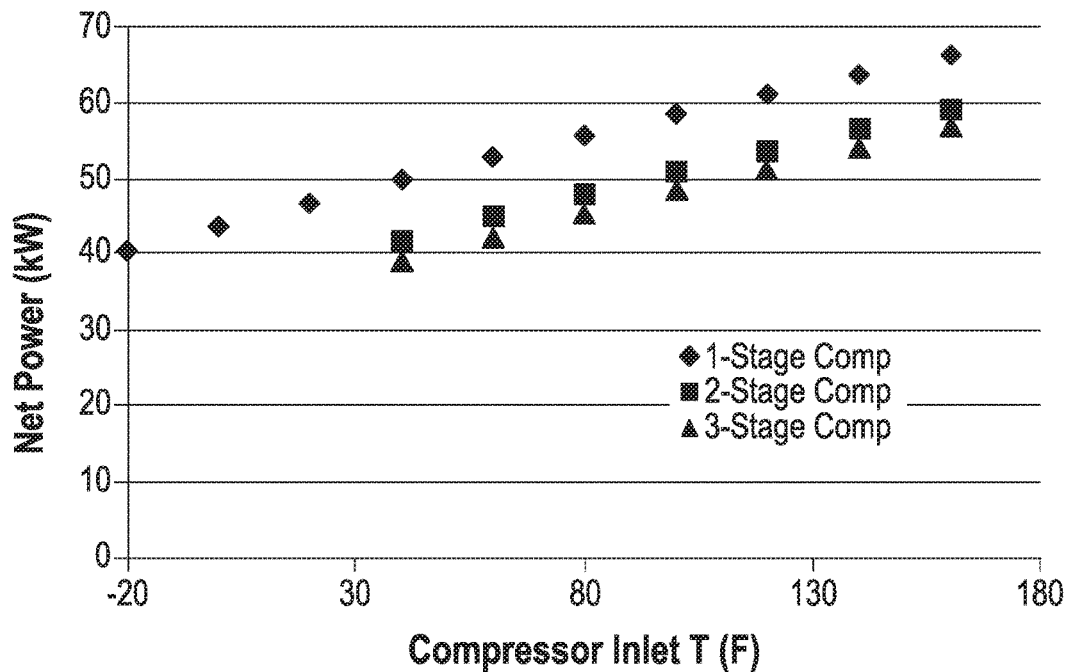
FIG. 21 is a graph of net power as a function of inlet temperature to the compressor for one-, two-, and three-stage compressions, generated using a computer model of an embodiment of the present invention.

In order to improve the performance of compressors and expanders, multiple stages are often employed. For example, in the calculations used in FIG. 20 it was assumed that the $CO_2$ was pressurized up to 900 psia from the starting pressure; this would be a one-stage process. For the purpose of the simulation, multiple expander or compressor units are modeled in series with heat exchangers to add/remove heat, as needed. FIG. 21 shows the variation in power input required to a compressor when it is run with 1-3 stages.

For the two-stage process, the first stage pressurized the 80° F. working fluid from 200-425 psia; the compression caused the fluid to warm, so a heat exchanger is used to reduce the temperature to 80° F. Then the second stage is run to pressurize from 425-900 psia.

For the three-stage process, the first stage pressurized the 80° F. working fluid from 200-330 psia; the compression caused the fluid to warm, so a heat exchanger is used to reduce the temperature to 80° F. Then the second stage is run to pressurize from 330-550 psia. Again, the compression heated working fluid is cooled to 80° F. and then enters the third stage where it achieves a final pressure of 900 psia.

As can be seen in FIG. 21, the additional stages reduce the power input required to pressurize the $CO_2$ working fluid. The difference is more significant between moving from one to two stages than from going two to three stages.

Figure 22:
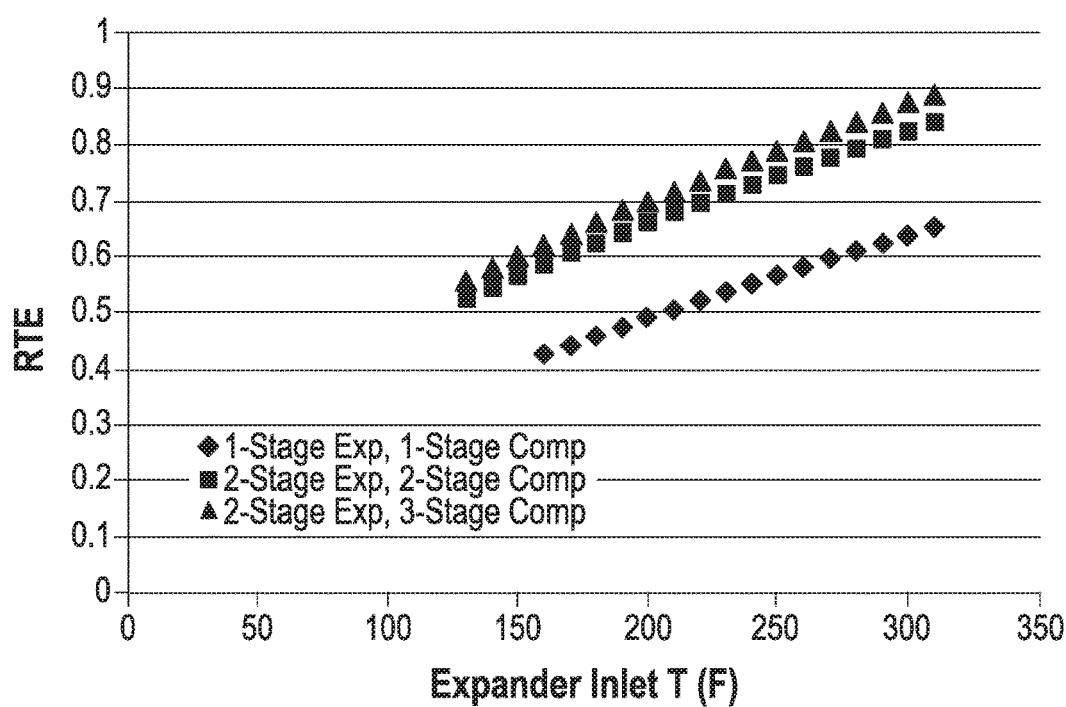
FIG. 22 is a graph of RTE as a function of inlet temperature to the expander for one-, two-, and three-stage compressions, generated using a computer model of an embodiment of the present invention.

Of particular interest in evaluating the process will be the percentage of the recharge power that can be delivered in discharge mode; this will be referred to as the Round Trip Efficiency (RTE). The minimum acceptable value for this process is 0.6 (60%). FIG. 22 shows the calculated RTE for a system operating between 200-900 psia.

Figure 23:
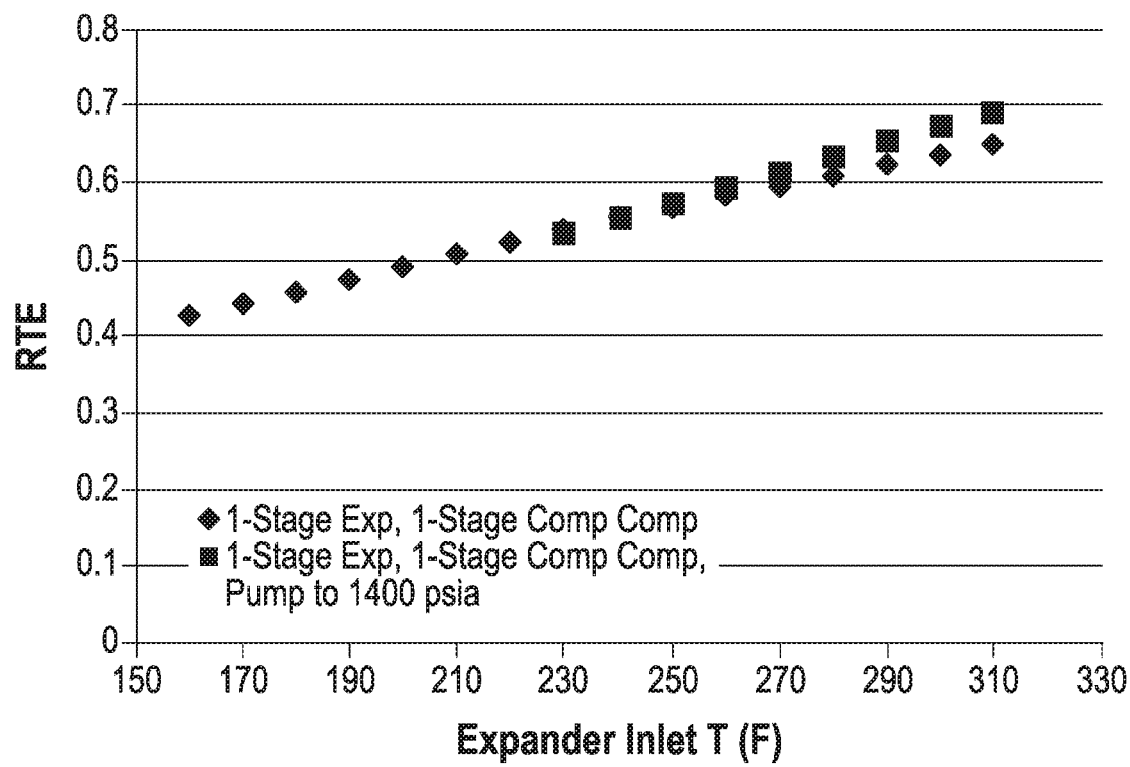
FIG. 23 is a graph of RTE as a function of expander inlet temperature, generated using a computer model of an embodiment of the present invention.

One method to improve power output is to pressurize the liquid $CO_2$ with a standard pump when it leaves the storage tank, and then add heat to move the working fluid into a supercritical state. This approach works because the power required to pressurize a liquid is significantly lower than the power output that can be gained from the expander (assuming a heat source is available, of course). FIG. 23 shows the improvement in RTE when the working fluid is delivered to the expander at 1400 psia.

Up to this point, the sorbent has not been considered in the analysis. All of the above calculations look at $CO_2$, and the power generated or consumed during discharge or recharge steps. The choice of sorbent is important for the system design. Of particular interest for the preceding analysis is the heat of solution. It has been assumed that the energy needed to heat the working fluid is available. One sorbent of interest is monoethanolamine (MEA). It has a high heat of solution with $CO_2$. Using the CHEMCAD AMINE model, it is possible to calculate the temperature of $CO_2$/MEA mixed solutions. One simulation looked at mixing 100% pure MEA with $CO_2$, and it was found that ~17 wt % $CO_2$ was dissolved and the final solution temperature achieved 330° F. Using this heated sorbent as the heat supply for the $CO_2$ heat exchanger prior to the expander, we found that it was possible to heat the $CO_2$ to 280° F. in two expansion stages. The outgoing sorbent stream still retained a significant amount of heat, as the outlet temperature was ~290° F. after heating the $CO_2$.

In order to achieve a high sorbent temperature, the MEA sorbent must dissolve a significant amount of $CO_2$. FIG. 18 shows the variation of temperature in MEA when $CO_2$ is added. To achieve high temperature (over 300° F.), the MEA must dissolve over 14 wt % $CO_2$. That means that significant $CO_2$ desorption must occur during the recharge step so the MEA will have the capacity to take up that much working fluid during the discharge step.

Example 4: Process Simulation No. 2

Another exemplary process was simulated using the software package described above. The following assumptions were made: 1) All streams can be heated or cooled to 80° F. from the atmosphere, whether heating or cooling. All phase change energy is supplied from the atmosphere. Energy to run the air blowers is neglected. 2) Working fluid liquid inlet condition is set at 70° F., where the fluid is a liquid at its vapor pressure. 3) Pressure is set between 100-856 psia and 200-856 psia. 4) Piston work is calculated as PdV. A simple curve fit of Pressure to Volume information was used for the integration. 5) Piston heat is calculated as TdS. 6) Assumed inefficiencies remained the same as with isentropic process—85% for expansion, 75% for compression. Lost energy is not accounted for in the simulation. 7) RTE is calculated as the power produced during piston expansion divided by the power required by the piston compression.

Figure 2:
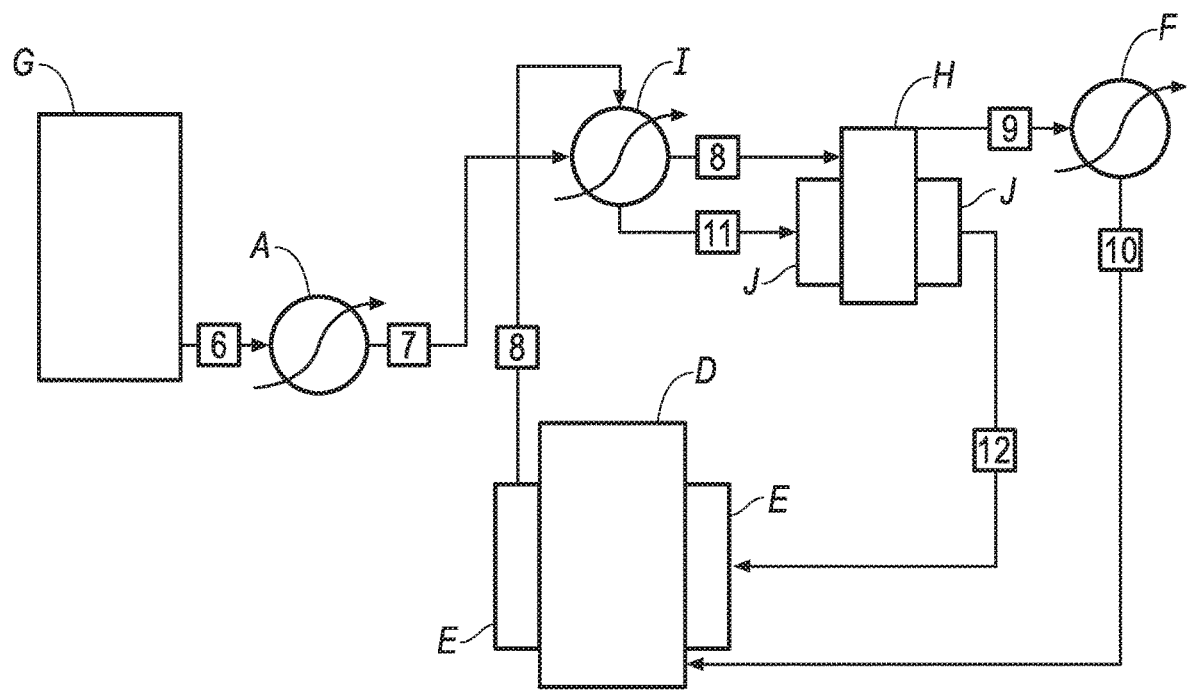
FIG. 2 is a schematic diagram of an embodiment of the mechanical-chemical energy storage system of the present invention being discharged.

A schematic of the process used for the simulation is shown in FIGS. 1 and 2 for recharge and discharge, respectively. Process conditions and the resulting RTE are shown in Table 3, below. A $CO_2$ model was used to model the working fluid for the simulation.

TABLE 3

| Discharge Sorption T = 160 F. | | | | | | |
|---|---|---|---|---|---|---|
| Streams | | | Unit Ops | | | |
| | T (F.) | P (psi) | | W (kJ/sec) | Q (kJ/sec) | Heat Source |
| 1 | 70 | 856 | A | | +68.5 | Air |
| 2 | 80 | 856 | B | | +28.1 | System |
| 3 | 150 | 856 | C | 35.2 | −55.0 | Exp. Cooling |
| 4 | 150 | 200 | D | | +55.0 | System |
| 5 | 160 | 200 | E | | +2.4 | System |
| Recharge Desorption T = 60 F. | | | | | | |
| | | | Unit Ops | | | |
| | T (F.) | P (psi) | | W (kJ/sec) | Q (kJ/sec) | Heat Source |
| 1 | 70 | 200 | A | | −61.3 | Air |
| 2 | 70 | 856 | B | 47.6 | +56.2 | Comp Heat |
| 3 | 70 | 856 | C | | −56.2 | System |
| $H^{ads}$ | | 85.5 | kJ/sec | | 8.3 | kJ/mol |
| RTE | | 0.74 | | | | |

TABLE 3-continued

Discharge Sorption T = 160 F.

| Streams | | | Unit Ops | | |
|---|---|---|---|---|---|
| | T (F.) | P (psi) | | W (kJ/sec) | Q (kJ/sec) | Heat Source |
| 1 | 70 | 856 | A | | +68.5 | Air |
| 2 | 80 | 856 | B | | +28.1 | System |
| 3 | 150 | 856 | C | 54.5 | −81.3 | Exp. Cooling |
| 4 | 150 | 100 | D | | +81.3 | System |
| 5 | 160 | 100 | E | | +2.3 | System |

Recharge Desorption T = 60 F.

| | | | Unit Ops | | |
|---|---|---|---|---|---|
| | T (F.) | P (psi) | | W (kJ/sec) | Q (kJ/sec) | Heat Source |
| 1 | 70 | 100 | A | | −61.3 | Air |
| 2 | 70 | 856 | B | 78.2 | +83.0 | Comp Heat |
| 3 | 70 | 856 | C | | −83.0 | System |

| $H^{ads}$ | 111.7 | kJ/sec | 10.8 | kJ/mol |
| RTE | 0.70 | | | |

To balance a system, such as the system described in this example or the other embodiments described herein, calculation of the minimum heat and maximum temperature of the absorber may be useful. Two criteria should be met. The first is the minimum heat of reaction required for the absorber. This is calculated by dividing the amount of energy required to reverse the chemical reaction of the working fluid with the absorber (the 'B' unit op column Q in the recharge cycle above) by the number of moles of working fluid needed to create a given amount of energy, which in this model is set at 1 #/sec. Thus, for $CO_2$ in this case is 10.32 moles.

So in the example above Q=56.2 kJ this divided by 10.32 moles=5.45 kJ/mole as a minimum reaction energy (delta G) for each mole of working fluid that reacts with each mole of absorber. The order of magnitude of this energy is actually very low compared to most chemical reactions. While it is good to have a delta G larger than the minimum it also needs to be reversible at a temperature that is available from the heat of compression. In general the higher the delta G the higher the temperature (and or pressure differential) that will be required to reverse the reaction. There is no exact formula that relates delta G to the temperature so each system has to be considered to make sure that it is reversible. Zeolites and activated carbons have delta G values of about 5 to about 20 kJ/mole for $CO_2$ and $NH_3$ working fluids. Another example is water and $CO_2$ going to $HCO_3^-$, which has a delta G of about 12 kJ/mole. Many of these compounds can easily be desorbed by allowing the pressure to decrease on them.

In the case of a solid absorbent, a secondary heat transfer loop using an inert heat transfer liquid may also be used. Heat exchange could also be accomplished by injecting an inert heat exchange fluid (such as silicone oil) into the expander and/or compressor as opposed to the external heat exchangers discussed herein.

Example 5: Process Simulation No. 3

Another exemplary process was simulated using the computer software package described above. The following assumptions were made: 1) All streams can be heated or cooled to 80° F. from the atmosphere, whether heating or cooling. All phase change energy is supplied from the atmosphere. Energy to run the air blowers is neglected. 2) Working fluid ($CO_2$) liquid inlet condition is set at 70° F., where the fluid is a liquid at its vapor pressure. 3) Pressure is set between 200-856 psia. 4) Desorption conditions not accounted for—assumed to happen at any T, P set. No pressure or temperature swing has been included. 5) Work is calculated as isentropic. 6) Assumed inefficiencies based mechanical losses (BNI)—98% for expansion, 96% for compression. Lost energy is not accounted for in the simulation. 7) RTE is calculated as the power produced during piston expansion divided by the power required by the piston compression.

Figure 3:
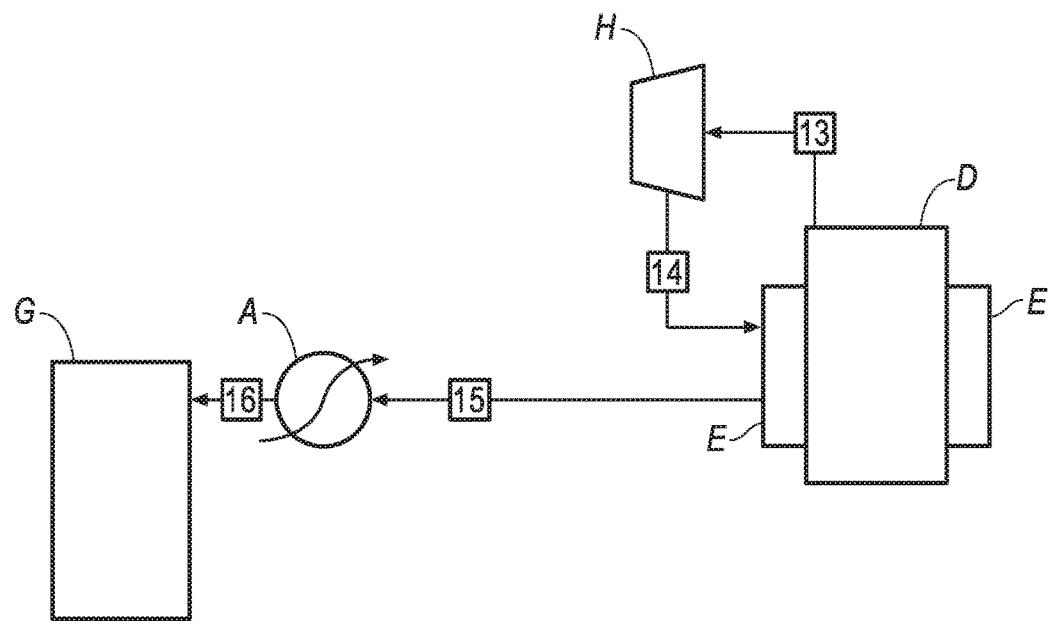
FIG. 3 is a schematic diagram of an embodiment of the mechanical-chemical energy storage system of the present invention being discharged.
Figure 4:
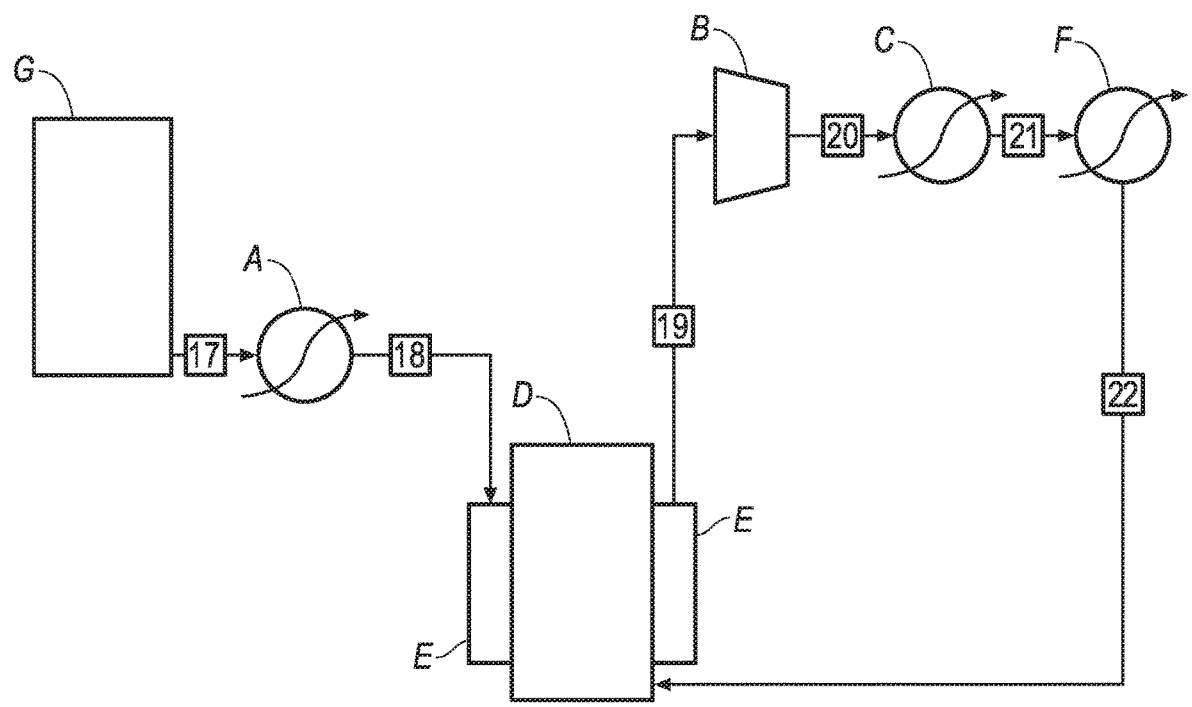
FIG. 4 is a schematic diagram of an embodiment of the mechanical-chemical energy storage system of the present invention being charged.

A schematic of the process used for the simulation is shown in FIGS. 3 and 4 for recharge and discharge, respectively. Process conditions and the resulting RTE are shown in Table 4, below. A $CO_2$ model was used to model the working fluid for the simulation.

TABLE 4

Carbon Dioxide - Isentropic, Single Stage.

Discharge Sorption T = 210 F.

| Streams | | | Unit Ops | | |
|---|---|---|---|---|---|
| | T (F.) | P (psi) | | W (kJ/sec) | Q (kJ/sec) | Heat Source |
| 1 | 70 | 856 | A | | +68.5 | Air |
| 2 | 80 | 856 | B | 31.0 | | |
| 3 | 150 | 856 | C | | +17.7 | Air |
| 4 | 4.1 | 200 | D | | +28.5 | System |
| 5 | 80 | 200 | E | | +2.4 | System |
| 6 | 200 | 200 | F | | +43.8 | System |

Recharge Desorption T = 70 F.

| | | | Unit Ops | | |
|---|---|---|---|---|---|
| | T (F.) | P (psi) | | W (kJ/sec) | Q (kJ/sec) | Heat Source |
| 1 | 70 | 200 | A | | −68.6 | Air |
| 2 | 286 | 856 | B | 40.7 | | |
| 3 | 80 | 856 | C | | | |
| 4 | 70 | 856 | D | | −68.9 | System |

| $H^{ads}$ | 68.9 | kJ/sec | 6.7 | kJ/mol | Heat from Absorber |
| RTE | 0.76 | | | | |

Carbon Dioxide - Isentropic, Two-Stage Expansion/Three-Stage Compression

Discharge Sorption T = 210 F.

| Streams | | | Unit Ops | | |
|---|---|---|---|---|---|
| | T (F.) | P (psi) | | W (kJ/sec) | Q (kJ/sec) | Heat Source |
| 1 | 70 | 856 | A | | +68.5 | Air |
| 2 | 80 | 856 | B | 35.8 | | System |
| 3 | 150 | 856 | C | | +17.7 | Air |
| 4 | 102.5 | 200 | D | | +28.5 | System |
| 5 | 80 | 200 | E | | +2.4 | System |
| 6 | 200 | 200 | F | | +43.8 | System |

Recharge Desorption T = 70 F.

| | | | Unit Ops | | |
|---|---|---|---|---|---|
| | T (F.) | P (psi) | | W (kJ/sec) | Q (kJ/sec) | Heat Source |
| 1 | 70 | 200 | A | | −68.7 | Air |
| 2 | 135.8 | 856 | B | 39.5 | −38.0 | System |
| 3 | 80 | 856 | C | | | |
| 4 | 70 | 856 | D | | −23.2 | System |

TABLE 4-continued

| | | | | | |
|---|---|---|---|---|---|
| $H^{ads}$ | 79.6 | kJ/sec | 7.7 | kJ/mol | Heat from absorber |
| RTE | 0.906 | | | | |

Example 6: Use of Air as Working Fluid and Half-Systems

One issue with conventional compressed air energy storage is the low energy density of the compressed gas. However, zeolite type absorbents will absorb air and have acceptable delta G values. If air were to be compressed into an insulated tank of zeolites, and then simply discharged to the atmosphere (no absorption on discharge) this would increase both the RTE of compressed air energy storage as well as the energy density.

This would operate conceptually as a half-system with only a single storage tank and that is not a closed cycle. However, it is an improvement over ordinary CAES. Both the heat of compression and the absorption energy will be stored and available for discharge. Although activated carbon also absorbs air, there should be a warning that high pressure air could ignite certain carbons and this would be a limit on those particular absorbents.

Example 7: Three-Loop Carbon Dioxide and Aqueous Ammonia System

The absorption of carbon dioxide in aqueous ammonia solution leads to a number of products including ammonium carbamate, bicarbonate, and carbonate. The ratio of these reaction products are a function of the carbon dioxide loading, solution pH, and the concentration of ammonia in the aqueous media.

Simplified chemical equations representing these reactions include:

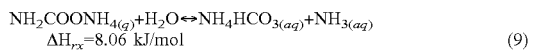

$$NH_2COONH_{4(q)} + H_2O \leftrightarrow NH_4HCO_{3(aq)} + NH_{3(aq)}$$
$$\Delta H_{rx} = 8.06 \text{ kJ/mol} \quad (9)$$

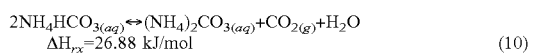

$$2NH_4HCO_{3(aq)} \leftrightarrow (NH_4)_2CO_{3(aq)} + CO_{2(g)} + H_2O$$
$$\Delta H_{rx} = 26.88 \text{ kJ/mol} \quad (10)$$

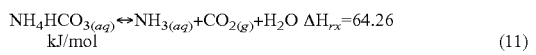

$$NH_4HCO_{3(aq)} \leftrightarrow NH_{3(aq)} + CO_{2(g)} + H_2O \quad \Delta H_{rx} = 64.26 \text{ kJ/mol} \quad (11)$$

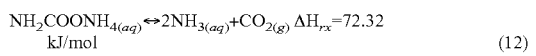

$$NH_2COONH_{4(aq)} \leftrightarrow 2NH_{3(aq)} + CO_{2(g)} \quad \Delta H_{rx} = 72.32 \text{ kJ/mol} \quad (12)$$

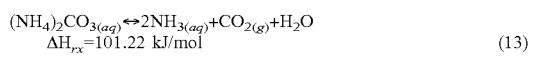

$$(NH_4)_2CO_{3(aq)} \leftrightarrow 2NH_{3(aq)} + CO_{2(g)} + H_2O$$
$$\Delta H_{rx} = 101.22 \text{ kJ/mol} \quad (13)$$

The schematic flow diagram for the process is shown in FIG. 13.

The operating parameters for the initial feasibility evaluation are:

1) Absorption vessel conditions are 150° F. and 257 psi (~66° C. and 1.77 Mpa);
2) Desorption vessel conditions are 180° F. and 257 psi (~82° C.);
3) Ammonia concentration level of 36% was maintained;
4) Total flow rate of working fluid equal to 142.6 kg/s;
5) Expansion efficiency: 88%;
6) Compressor efficiency: 84%;
7) Heat exchanger efficiency: 2%;
8) The molar ratios of carbon dioxide to ammonia in solution are between 0.35 to 0.60;
9) The reversible heat of reaction: 80 kJ/mol; and
10) Thermodynamic and transport properties estimated with using the National Institute of Standards and Technology (NIST) standard reference program.

All state functions, for each location, as shown in FIG. 13 are shown in Table 5.

TABLE 5

Physical parameters data at various locations.

| Location[3] | Temperature (° K) | Pressure (Mpa) | Density (kg/m³) | Enthalpy (kJ/kg) | Entropy (kJ/kg ° K) |
|---|---|---|---|---|---|
| 901 | 333.15 | 6.63 | 143.66 | 476.09 | 1.9083 |
| 903 | 333.15 | 3.76 | 69.441 | 506.26 | 2.0852 |
| 904 | 299.82 | 2.3442 | 47.202 | 484.33 | 2.0935 |
| 905 | 333.15 | 2.32 | 40.213 | 518.9 | 2.2043 |
| 906 | 298.71 | 1.77 | 34.596 | 489.59 | 2.1581 |
| 915 | 305.37 | 2.28 | 44.562 | 490.84 | 2.1193 |
| 916 | 333.71 | 3.17 | 56.84 | 512.2 | 2.1311 |
| 917 | 305.37 | 3.14 | 64.921 | 481.07 | 2.0351 |
| 918 | 333.15 | 4.316 | 81.984 | 500.96 | 2.0469 |
| 919 | 305.37 | 4.275 | 96.472 | 466.34 | 1.9401 |
| 920 | 334.26 | 5.9 | 120.76 | 486.74 | 1.9568 |
| 921 | 358.71 | 2.31 | 36.386 | 544.63 | 2.2795 |
| 934 | 333.15 | 1.74 | 29.28 | 523.73 | 2.2703 |
| 934(l)* | 333.15 | 1.74 | | | |
| 937 | 333.15 | 1.77 | 30.01 | 523.41 | 2.2653 |
| 940 | 339.93 | 6.63 | 136.34 | 486.23 | 1.9384 |
| 941 | 355.37 | 1.73 | 27.09 | 545.31 | 2.333 |
| 942 | 352.59 | 1.73 | 27.339 | 542.61 | 2.3254 |
| 943(l)* | 330.37 | 1.77 | | | |
| 945(l)* | 355.37 | 1.73 | | | |
| 946(l)* | 352.59 | 1.73 | | | |

[3]Locations are shown in FIG. 13.
*Assuming that heat capacity ($C_p$) of the solution (both rich and lean) containing $CO_2/NH_3/H_2O$ is equal to 1 cal/g ° C.

All calculations and thermodynamic state function are normalized to 1 kg of carbon dioxide of working fluid. The assumed value for heat capacity ($C_p$), for the carbon dioxide/ammonia/water solution is equal to 1 cal/g° C. The assumed density for the carbon dioxide/ammonia/water solution is equal to 1 g/cm³. The sensible heat requirements: 29.9 kJ/kg carbon dioxide and stripping heat is zero.

The value for each expansion and compression work is calculated as follows: E1 is calculated by referring to Table 5 above and FIG. 13; subtracting the H (enthalpy) of the noted output numbers corresponding to each device on the flow diagram (line 9, Table 5) from the H (enthalpy) of the input (line 1, Table 5). Thus, the value for E1 is 451.7–476.09=24.39. Similarly, the values for multi-stage expanders (E1, E2 and E3) and multi-stage compressors are shown in Tables 6 and 7.

TABLE 6

Multi-Stage Expanders.

| Expansion Stages[4] | Work, kJ/kg $CO_2$ | Heat Exchangers | Q kJ/kg $CO_2$ |
|---|---|---|---|
| E1 | −24.39 | $H_x1$ | 54.56 |
| E2 | −21.93 | $H_x2$ | 34.57 |
| E3 | −29.31 | $H_x3$ | 33.82 |
| Total | −75.65 | | 122.95 |

[4]Expansion stages E1, E2 and E3 are shown in FIG. 13.

TABLE 7

Multi-Stage Compressors.

| Compression Stages[3] | Work, kJ/kg $CO_2$ | Heat Exchangers | Q kJ/kg $CO_2$ |
|---|---|---|---|
| C1 | 20.90 | $H_x4$ | −53.79 |
| C2 | 21.36 | $H_x5$ | −31.13 |
| C3 | 19.89 | $H_x6$ | −34.62 |
| C4 | 20.40 | | |
| C5 | −.61 | | |
| Total: | 82.55 | | −119.54 |

[3]Compression stages C1, C2, C3, C4 and C5 are shown in FIG. 13.

Estimation of Sensible Heat:

The sensible heat is defined as the amount of energy required to raise the temperature of the solution to the temperature of regeneration, which while not recovered in this flow chart, may allow for partial recovery. Assuming 36% by weight of ammonia concentration in water and maintaining the molar ratio of carbon dioxide to ammonia in the solution between 0.35 to 0.6 during absorption and desorption cycle, the reaction heat is:

$$(Q_{absorption} + Q_{desorption})/2 = (122.95 + 119.54)/2 = 121.3 \text{ kJ/kg } CO_2$$

Since the total ΔQ for desorption and absorption is essentially equal.

Accepting reaction heat 80 kJ/mol, as reported in the literature $$80 \times [(1000 \times 0.36)(0.6-0.35)/17] = 424 \text{ kJ/kg of solution}$$

The ΔT is the temperature difference between stream 43 and reboiler 180−135° F.=25° C.

Sensible ($Q_{sensible}$) heat is equal to $$Q_{sensible} = (121.3 \times 25 \times 4.18)/424 = 29.9 \text{ kJ/kg } CO_2$$

The system Efficiency:

Efficiency (RTE)=[(Work out)/(Work in+Sensible Heat)]×100

RTE=[75.65/(82.55+29.9)]×100=67.2%

Example 8: Process Simulation No. 4

The system illustrated in FIG. 15 was simulated using ASPEN modeling software. This simulation is independent of the absorbent and employs $CO_2$ as the working fluid.

This simulation calculates the thermodynamic efficiency of $CO_2$ working fluid as it completes a full charge-discharge cycle. Note that this simulation does not show a specific absorption reaction. It assumes that heat is put into a given reaction during charging/compression and withdrawn from the reverse of that reaction during the discharge/expansion thru the heat exchangers. The data generated in this simulation is presented in Tables 8-15, below.

TABLE 8

Expander Efficiency: 85%, Compressor Effic.: 84%
Different Compressor Temperature Out.
E30(P) = C10(P); C40(T, P) = E10(T, P); E30(T) NOT = C10(T)

| | Final Pr. Out | Final Temp Out | Heater Temp Out | Power MW | |
|---|---|---|---|---|---|
| E10 | 35.00 | 72.17 | 110 | 2.81 | E10 in T/P: |
| E20 | 15.00 | 51.20 | 100 | 4.38 | 115 deg C./61 bar |
| E30 | 6.00 | 41.60 | | 4.80 | |
| | | | | 11.99 | |

| | Final Pr. Out | Final Temp Out | Cooler Temp Out | Power MW | |
|---|---|---|---|---|---|
| C10 | 14.94 | 100 | 69 | 6.90 | C10 in T/P: |
| C20 | 21.03 | 100 | 62 | 2.58 | 18 deg C./5.6 bar |
| C30 | 35.46 | 110 | 63 | 3.82 | |
| C40 | 61.51 | 115 | | 3.81 | |
| | | | | 17.12 | |
| | | | TRUE RTE | 70.06 | |

TABLE 9

Expander Efficiency: 85%, Compressor Effic.: 84%
Different Compressor Temperature Out.
E30(P) = C10(P); C40(T, P) = E10(T, P); E30(T) NOT = C10(T)

| | Final Pr. Out | Final Temp Out | Heater Temp Out | Power MW | |
|---|---|---|---|---|---|
| E10 | 35.00 | 72.17 | 110 | 2.81 | E10 in T/P: |
| E20 | 15.00 | 51.20 | 100 | 4.38 | 115 deg C./61 bar |
| E30 | 6.00 | 41.60 | | 4.80 | |
| | | | | 11.99 | |

| | Final Pr. Out | Final Temp Out | Cooler Temp Out | Power MW | |
|---|---|---|---|---|---|
| C10 | 13.80 | 103 | 69 | 6.38 | C10 in T/P: |
| C20 | 21.02 | 103 | 62 | 3.17 | 28 deg C./5.7 bar |
| C30 | 35.44 | 110 | 63 | 3.82 | |
| C40 | 61.47 | 115 | | 3.81 | |
| | | | | 17.19 | |
| | | | TRUE RTE | 69.78 | |

TABLE 10

Expander Efficiency: 85%, Compressor Effic.: 84%
Different Compressor Temperature Out.
E30(P) = C10(P); C40(T, P) = E10(T, P); E30(T) NOT = C10(T)

| | Final Pr. Out | Final Temp Out | Heater Temp Out | Power MW | |
|---|---|---|---|---|---|
| E10 | 35.00 | 77.01 | 120 | 2.87 | E10 in T/P: |
| E20 | 15.00 | 60.49 | 105 | 4.53 | 120 deg C./61 bar |
| E30 | 6.00 | 46.12 | | 4.88 | |
| | | | | 12.28 | |

TABLE 10-continued

Expander Efficiency: 85%, Compressor Effic.: 84%
Different Compressor Temperature Out.
E30(P) = C10(P); C40(T, P) = E10(T, P); E30(T) NOT = C10(T)

|     | Final Pr. Out | Final Temp Out | Cooler Temp Out | Power MW |               |
| --- | ------------- | -------------- | --------------- | -------- | ------------- |
| C10 | 12.25         | 101            | 64              | 5.48     | C10 in T/P:   |
| C20 | 19.43         | 104.5          | 62              | 3.49     | 37 deg C./5.8 bar |
| C30 | 33.89         | 112            | 61              | 4.10     |               |
| C40 | 61.39         | 117            |                 | 4.12     |               |
|     |               |                |                 | 17.20    |               |
|     |               | TRUE RTE       |                 | 71.42    |               |

TABLE 11

Expander Efficiency: 85%, Compressor Effic.: 84%
Different Compressor Temperature Out.
E30(P) = C10(P); C40(T, P) = E10(T, P); E30(T) NOT = C10(T)

|     | Final Pr. Out | Final Temp Out | Heater Temp Out | Power MW |                   |
| --- | ------------- | -------------- | --------------- | -------- | ----------------- |
| E10 | 35.00         | 72.17          | 110             | 2.81     | E10 in T/P:       |
| E20 | 15.00         | 51.20          | 100             | 4.38     | 115 deg C./61 bar |
| E30 | 6.00          | 41.60          |                 | 4.80     |                   |
|     |               |                |                 | 11.99    |                   |

|     | Final Pr. Out | Final Temp Out | Cooler Temp Out | Power MW |                   |
| --- | ------------- | -------------- | --------------- | -------- | ----------------- |
| C10 | 12.70         | 102            | 69              | 5.73     | C10 in T/P:       |
| C20 | 20.01         | 105            | 62              | 3.45     | 35 deg C./5.8 bar |
| C30 | 34.13         | 111            | 63              | 3.93     |                   |
| C40 | 61.20         | 116            |                 | 4.04     |                   |
|     |               |                |                 | 17.15    |                   |
|     |               | TRUE RTE       |                 | 69.94    |                   |

TABLE 12

Expander Efficiency: 85%, Compressor Effic.: 84%
Different Compressor Temperature Out.
E30(P) = C10(P); C40(T, P) = E10(T, P); E30(T) NOT = C10(T)

|     | Final Pr. Out | Final Temp Out | Heater Temp Out | Power MW |                   |
| --- | ------------- | -------------- | --------------- | -------- | ----------------- |
| E10 | 35.00         | 77.01          | 120             | 2.87     | E10 in T/P:       |
| E20 | 15.00         | 60.49          | 105             | 4.53     | 120 deg C./61 bar |
| E30 | 6.00          | 46.12          |                 | 4.88     |                   |
|     |               |                |                 | 12.28    |                   |

|     | Final Pr. Out | Final Temp Out | Cooler Temp Out | Power MW |                   |
| --- | ------------- | -------------- | --------------- | -------- | ----------------- |
| C10 | 12.48         | 102            | 64              | 5.58     | C10 in T/P:       |
| C20 | 19.68         | 105            | 62              | 3.54     | 35 deg C./5.7 bar |
| C30 | 33.57         | 111            | 61              | 4.10     |                   |
| C40 | 61.10         | 116            |                 | 4.12     |                   |
|     |               |                |                 | 17.33    |                   |
|     |               | TRUE RTE       |                 | 70.85    |                   |

TABLE 13

| Location | Pressure [bar] | Temp. [C.]  | Mass Flow [kg/s] | Std Ideal Liq Vol Flow [m3/h] | Vapor/ Phase Fraction | Molar Enthalpy [kJ/kgmole] |
| -------- | -------------- | ----------- | ---------------- | ----------------------------- | --------------------- | -------------------------- |
| 1921     | 14.93721229    | 100         | 100              | 436.1865066                   | 1                     | −391267.0048               |
| 1915     | 14.93721229    | 69          | 100              | 436.1865066                   | 1                     | −392586.3377               |
| 1916     | 21.03372089    | 100         | 100              | 436.1865066                   | 1                     | −391449.4834               |
| 1917     | 21.03372089    | 62          | 100              | 436.1865066                   | 1                     | −393111.4838               |
| 1918     | 35.46339734    | 110         | 100              | 436.1865066                   | 1                     | −391429.8615               |
| 1919     | 35.46339734    | 63          | 100              | 436.1865066                   | 1                     | −393637.51                 |
| 1940     | 61.51466519    | 115         | 100              | 436.1865066                   | 1                     | −391959.8495               |
| 1934     | 5.6            | 18          | 100              | 436.1865066                   | 1                     | −394303.7714               |
| 1909     | 35             | 72.1652056  | 100              | 436.1865066                   | 1                     | −393181.8818               |
| 1903     | 35             | 110         | 100              | 436.1865066                   | 1                     | −391416.2255               |
| 1904     | 15             | 51.19538871 | 100              | 436.1865066                   | 1                     | −393342.6754               |
| 1905     | 15             | 100         | 100              | 436.1865066                   | 1                     | −391268.8689               |
| 1906     | 6              | 41.60482521 | 100              | 436.1865066                   | 1                     | −393382.2592               |
| 1941-2   | 61             | 22          | 100              | 436.1865066                   | 0                     | −404047.2745               |
| 1900     | 61             | 115         | 100              | 436.1865066                   | 1                     | −391944.4882               |
| 1941     | 61.51466519    | 22          | 100              | 436.1865066                   | 0                     | −404077.447                |

TABLE 14

|                     | Hx40        | Hx50       | Hx60        | Hx70    |
| ------------------- | ----------- | ---------- | ----------- | ------- |
| Duty [kJ/h]         | 10792163.03 | 13595187.4 | 18058597.24 | 9.9E+07 |
| Pressure Drop [kPa] | 0           | 0          | 0           | 0       |

TABLE 15

|  | C10 | C20 | C30 | C40 |
|---|---|---|---|---|
| Compressor Speed [rpm] | | | | |
| Power [kW] | 6900.221073 | 2583.190312 | 3821.02624 | 3812.02 |
| Capacity (act feed vol flow) [ACT_m3/h] | 34174.65632 | 14743.26663 | 9951.324512 | 5550.81 |
| Adiabatic Efficiency | 84 | 84 | 84 | 84 |
| Polytropic Efficiency | 85.57271157 | 84.58712734 | 84.90616828 | 84.988 |
| Compressor Volume [m3] | 0 | 0 | 0 | 0 |
| Delta T [C.] | 82 | 31 | 48 | 52 |
| Delta P [kPa] | 933.7212287 | 609.6508608 | 1442.967645 | 2605.13 |
| Polytropic Head [m] | 6021.124725 | 2228.127363 | 3308.252024 | 3303.64 |
| Adiabatic Head [m] | 5910.464533 | 2212.661675 | 3272.944422 | 3265.23 |
| Dynamic Head [m] | 6021.124725 | 2228.127363 | 3308.252024 | 3303.64 |
| Polytropic Fluid Head [kJ/kg] | 59.04706278 | 21.8504652 | 32.44286971 | 32.3976 |
| Adiabatic Fluid Head [kJ/kg] | 57.96185701 | 21.69879862 | 32.09662041 | 32.021 |
| Dynamic Fluid Head [kJ/kg] | 59.04706278 | 21.8504652 | 32.44286971 | 32.3976 |
| Polytropic Head Factor | 1.00068214 | 1.00002664 | 0.999848205 | 0.99913 |
| Polytropic Exponent | 1.327392038 | 1.328738561 | 1.333983706 | 1.36064 |
| Isentropic Exponent | 1.266002311 | 1.261753035 | 1.266416427 | 1.2885 |
| Dynamic Delta P | | | | |
| RC-Typical Design Speed | | | | |
| RC-Volumetric Efficiency | | | | |
| PD Number of Cylinders | 0 | 0 | 0 | 0 |
| PD Bore [m] | | | | |
| PD Stroke [m] | | | | |
| PD Piston Rod Diameter [m] | | | | |
| PD Const Volmetric Efficiency Loss [%] | | | | |
| Transient Rotational Power [kW] | 0 | 0 | 0 | 0 |
| Friction Loss Power [kW] | 0 | 0 | 0 | 0 |
| Fluid Power [kW] | 6900.221073 | 2583.190312 | 3821.02624 | 3812.02 |
| Total Rotor Torque [N-m] | | | | |
| Transient Rotational Torque [N-m] | | | | |
| Friction Loss Torque [N-m] | | | | |
| Fluid Torque [N-m] | | | | |
| Duty [kJ/h] | 24840795.86 | 9299485.123 | 13755694.46 | 1.4E+07 |

Other Embodiments

All publications and patents referred to in this disclosure are incorporated herein by reference to the same extent as if each individual publication or patent application were specifically and individually indicated to be incorporated by reference. Should the meaning of the terms in any of the patents or publications incorporated by reference conflict with the meaning of the terms used in this disclosure, the meaning of the terms in this disclosure are intended to be controlling. Furthermore, the foregoing discussion discloses and describes merely example embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. An energy storage system comprising:
   a working fluid reservoir containing compressed working fluid;
   an expander that fluidly communicates with the working fluid reservoir and is configured to expand the working fluid;
   an absorbent reservoir containing an absorbent, wherein the absorbent reservoir fluidly communicates with the expander and is configured to receive and absorb the expanded working fluid;
   a first heat exchanger that thermally communicates with the absorbent reservoir and is configured to transfer heat generated by the absorption of the working fluid by the absorbent to the working fluid during the discharge of the system;
   a pressure release mechanism configured to reduce pressure in the absorbent reservoir; and
   a compressor that fluidly communicates with the absorbent reservoir and fluidly communicates with the working fluid reservoir and is configured to compress the working fluid that desorbs from the absorbent; and
   a second heat exchanger in thermal communication with the working fluid in the compressor, in thermal communication with the absorbent and working fluid in the absorbent storage tank, and configured to transfer heat that is generated by the compression of the working fluid, to the absorbent and working fluid in the absorbent reservoir.

2. The system of claim 1, wherein the working fluid comprises carbon dioxide, ammonia, nitrous oxide, air, or water.

3. The system of claim 2, wherein the working fluid comprises carbon dioxide.

4. The system of claim 3, wherein the absorbent comprises an organic amine, inorganic base, activated carbon, silica gel, zeolite, or metal organic framework.

5. The system of claim 4, wherein the absorbent comprises an organic amine selected from monoethanolamine, piperazine, ammonia, morpholine, diethanolamine, diglycolamine, diisopropanolamine, triethanolamine, dibutylamine, methyl-diethanolamine, or diethylenetriamine.

6. The system of claim 2, wherein the working fluid comprises ammonia.

7. The system of claim 6, wherein the absorbent comprises a metal halide salt, mild acid, water, activated carbon, silica gel, zeolite, or metal organic framework.

8. The system of claim 2, wherein the working fluid comprises nitrous oxide.

9. The system of claim 8, wherein the absorbent comprises a food oil, silicone oil, activated carbon, silica gel, zeolite, or metal organic framework.

10. The system of claim 1, wherein the compressor and expander comprise a reversible turbine.

11. The system of claim 1, wherein the compressor comprises a turbine, piston, radial reaction turbine.

12. The system of claim 1, wherein the expander comprises a turbine, piston, or turbo-expander.

13. The system of claim 1, further comprising an electrical generator connected to the expander.

14. The system of claim 1, further comprising a motor connected to the compressor.

15. The system of claim 1, further comprising an external heat source, in thermal communication with the expanded working fluid.

16. The system of claim 1, further comprising a controller connected to the compressor, expander, pressure release mechanism, absorbent storage tank, and working fluid storage tank.

17. The system of claim 1, wherein the first heat exchanger and second heat exchanger each comprise high surface area fin-shaped structures within the absorbent storage tank.

18. The system of claim 1, further comprising one or more additional compressors, fluidly connected to and positioned between the first compressor and the working fluid storage tank.

19. The system of claim 1, further comprising one or more additional expanders, fluidly connected to and positioned between the first expander and the absorbent storage tank.

20. The system of claim 1, wherein the pressure release mechanism is a valve.

21. The system of claim 1, further comprising a pump and a sprayer that each fluidly communicates with each other and with the absorbent storage tank, wherein the pump pumps the absorbent and absorbed working fluid to the sprayer and the sprayer sprays the fluid into the absorbent storage tank.

22. The system of claim 21, wherein the sprayer sprays the absorbent over a heat exchanger with high surface area fin-shaped structures within the absorbent storage tank.

23. The system of claim 1, further comprising a separator that fluidly communicates with the absorbent storage tank and the compressor.

24. The system of claim 23, wherein the separator is a centrifugal or cyclonic separator.

25. The system of claim 23, wherein the separator is a demister or a filter.

* * * * *